United States Patent
Ramanarayanan et al.

(10) Patent No.: US 11,556,754 B1
(45) Date of Patent: Jan. 17, 2023

(54) SYSTEMS AND METHODS FOR DETECTING CO-OCCURRENCE OF BEHAVIOR IN COLLABORATIVE INTERACTIONS

(71) Applicant: Educational Testing Service, Princeton, NJ (US)

(72) Inventors: Vikram Ramanarayanan, San Francisco, CA (US); Saad Khan, Yardley, PA (US)

(73) Assignee: Educational Testing Service, Princeton, NJ (US)

( * ) Notice: Subject to any disclaimer, the term of this patent is extended or adjusted under 35 U.S.C. 154(b) by 1141 days.

(21) Appl. No.: 15/452,809

(22) Filed: Mar. 8, 2017

Related U.S. Application Data

(60) Provisional application No. 62/304,978, filed on Mar. 8, 2016.

(51) Int. Cl.
  *G06N 3/00* (2006.01)
  *G06N 20/00* (2019.01)
  *G06F 16/22* (2019.01)

(52) U.S. Cl.
  CPC ............ *G06N 3/006* (2013.01); *G06F 16/22* (2019.01); *G06N 20/00* (2019.01)

(58) Field of Classification Search
  CPC ............ G06N 20/00; G06N 5/04; G06N 3/08; G06N 3/006; G06Q 10/10; G06Q 50/01; G06Q 30/0201; G06Q 10/06393; H04L 67/22; G06F 16/285; G06F 40/30; G06F 16/22
  See application file for complete search history.

(56) References Cited

U.S. PATENT DOCUMENTS

| | | | |
|---|---|---|---|
| 2009/0106040 A1* | 4/2009 | Jones ................. | G06Q 30/02 705/319 |
| 2014/0212854 A1* | 7/2014 | Divakaran ............. | G09B 19/00 434/236 |
| 2014/0295400 A1 | 10/2014 | Zapata-Rivera et al. | |

(Continued)

OTHER PUBLICATIONS

Zue et al., "Speech Database Developmental MIT: TIMIT and Beyond," 1990, Speech Communication 9, pp. 351-356 (Year: 1990).*

(Continued)

*Primary Examiner* — Vincent Gonzales
(74) *Attorney, Agent, or Firm* — Jones Day

(57) ABSTRACT

Systems and methods for computer-implemented evaluation of a performance are provided. In a first aspect, a computer-implemented method of evaluating an interaction generates a first temporal record of first behavior features exhibited by a first entity during an interaction between a first entity and a second entity. A second temporal record is generated including second behavior features exhibited by a second entity during an interaction with a first entity. A determination is made that a first feature of a first temporal record is associated with a second feature of a second temporal record. The length of time that passes between the first feature and second feature is evaluated, and a determination is made that the length of time satisfies a temporal condition. A co-occurrence record associated with a first feature and a second feature is generated and included in a co-occurrence record data-structure.

22 Claims, 9 Drawing Sheets

(56) References Cited

U.S. PATENT DOCUMENTS

2014/0302469 A1 10/2014 Chen et al.
2015/0269529 A1 9/2015 Kyllonen et al.

OTHER PUBLICATIONS

Smith, "Effective Spoken Natural Language Dialog Requires Variable Initiative Behavior: An Empirical Study," 1993, AAAI Technical Report FS-93-05, pp. 101-106 (Year: 1993).*
Vizer et al., "Automated stress detection using keystroke and linguistic features: An exploratory study," 2009, International Journal Human-Computer Studies 67, pp. 870-886 (Year: 2009).*
Brizan et al., "Utilizing linguistically enhanced keystroke dynamics to predict typist cognition and demographics," 2015, International Journal Human-Computer Studies 82, pp. 57-68 (Year: 2015).*
Van hamme, "HAC-models: a Novel Approach to Continuous Speech Recognition," Sep. 2008, INTERSPEECH 2008, 9th Annual Conference of the International Speech Communication Association, pp. 2554-2557 (Year: 2008).*
Van Segbroeck et al., "Unsupervised learning of time-frequency patches as a noise-robust representation of speech," 2009, Speech Communication 51, pp. 1124-1138 (Year: 2009).*
Niederhoffer et al., "Linguistic Syle Matching in Social Interaction," Dec. 2002, Journal of Language and Social Psychology, vol. 21, No. 4, pp. 337-360 (Year: 2002).*
Dash A, Cote M, Branzan Albu A. Automatic speaker identification from interpersonal synchrony of body motion behavioral patterns in multi-person videos. In Proceedings of the 1st Workshop on Modeling INTERPERsonal SynchrONy and infLuence Nov. 13, 2015 (pp. 31-34). (Year: 2015).*
Barsade, Sigal; The Ripple Effect: Emotional Contagion and Its Influence on Group Behavior; Administrative Science Quarterly, 47(4); pp. 644-675; Dec. 2002.
Bazaldua, Diego Luna, Khan, Saad, Von Davier, Alina, Hao, Jiangang, Liu, Lei, Wang, Zuowei; On Convergence of Cognitive and Noncognitive Behvaior in Collaborative Activity; Proceedings of the 8th International Conference on Educational Data Mining; pp. 496-499; 2015.
Bilakhia, Sanjay, Petridis, Stavros, Pantic, Maja; Audiovisual Detection of Behavioural Mimicry; IEEE Humaine Association Conference on Affective Computing and Intelligent Interaction; pp. 123-128; 2013.
Ekman, Paul, Rosenberg, Erika; What the Face Reveals: Basic and Applied Studies of Spontaneous Expression Using the Facial Action Coding System (FACS); Oxford University Press: New York, NY; 1997.
Jucks, Regina, Becker, Bettina-Maria, Bromme, Rainer; Lexical Entrainment in Written Discourse: Is Experts' Word Use Adapted to the Addressee?; Discourse Processes, 45(6); pp. 497-518; Nov. 2008.
Lakin, Jessica, Jefferis, Valerie, Cheng, Clara; Chartrand, Tanya; The Chameleon Effect as Social Glue: Evidence for the Evolutionary Significance of Nonconscious Mimicry; Journal of Nonverbal Behavior, 27(3); pp. 145-162; Fall 2003.
Levitan, Rivka, Gravano, Agustin, Willson, Laura, Benus, Stefan, Hirschberg, Julia, Nenkova, Ani; Acoustic-Prosodic Entrainment and Social Behavior; Proceedings of the North American Chapter of the Association for Computational Linguistics: Human Language Technologies; pp. 11-19; Jun. 2012.
Littlewort, Gwen, Whitehill, Jacob, Wu, Tingfan, Fasel, Ian, Frank, Mark, Movellan, Javier, Bartlett, Marian; The Computer Expression Recognition Toolbox (CERT); IEEE International Conference on Automatic Face & Gesture Recognition; pp. 298-305; 2011.
Liu, Lei, HAO, Jiangang, Von Davier, Alina, Kyllonen, Patrick, Zapata-Rivera, Diego; A Tough Nut to Crack: Measuring Collaborative Problem Solving; Ch. 13 in Handbook of Research on Technology Tools for Real-Worid Skill Development; p. 344-359; 2015.

Pardo, Jennifer; On Phonetic Convergence During Conversational Interaction; Journal of the Acoustical Society of America, 119(4); pp. 2382-2393; Apr. 2006.
Ramanarayanan, Vikram, Leong, Chee Wee, Chen, Lei, Feng, Gary, Suendermann-Oeft, David; Evaluating Speech, Face, Emotion and Body Movement Time-Series Features for Automated Multimodal Presentation Scoring; Proceedings of the ACM International Conference on Multimodal Interaction; pp. 23-30; Nov. 2015.
Ramanarayanan, Vikram, Van Segbroeck, Maarten, Narayanan, Shrikanth; Directly Data-Derived Articulatory Gesture-Like Representations Retain Discriminatory Information About Phone Categories; Computer Speech and Language, 36; pp. 330-346; Mar. 2016.
Tawfik, Andrew, Sanchez, Lenny, Saparova, Dinara; The Effects of Case Libraries in Supporting Collaborative Problem-Solving in an Online Learning Environment; Technology, Knowledge and Learning, 19(3); pp. 337-358; Oct. 2014.
Thomason, Jesse, Nguyen, Huy, Litman, Diane; Prosodic Entrainment and Tutoring Dialogue Success; in Artificial Intelligence in Education, AIED 2013; Springer: Berlin; pp. 750-753; 2013.
Van Hamme, Hugo; HAC-models: A Novel Approach to Continuous Speech Recognition; Interspeech; pp. 2554-2557; Sep. 2008.
Van Segbroeck, Maarten, Van Hamme, Hugo; Unsupervised Learning of Time-Frequency Patches as a Noise-Robust Representation of Speech; Speech Communication, 51(11); pp. 1124-1138; 2009.
Zapata-Rivera, Diego, Jackson, Tanner, Liu, Lei, Bertling, Maria, Vezzu, Margaret, Katz, Irvin; Assessing Science Inquiry Skills Using Trialogues; Intelligent Tutoring Systems; 8474; pp. 625-626; 2014.
Boersma, Paul, Weenink, David; Praat, a System for Doing Phonetics By Computer; Institute of Phonetic Sciences, University of Amsterdam; Technical Report 132; 1996.
Cabral, Joao, Campbell, Nick, Ganesh, Shree, Gilmartin, Emer; Haider, Fashih, Kenny, Eamonn, Kheirkhah, Mina, Murphy, Andrew, Chiarain, Neasa, Pellegrini, Thomas, Orozko, Odei; Milla Multimodal Interactive Language Learning Agent; ENTERFACE 2014; 2014.
Chang, Chih-Chung, Lin, Chih-Jen; LIBSVM: A Library for Support Vector Machines; ACM Transactions on Intelligent Systems and Technology, 2(3); Apr. 2011.
Chen, Lei, Yoon, Su-Youn; Application of Structural Events Detected on ASR Outputs for Automated Speaking Assessment; Proceedings of INTERSPEECH; 2012.
Chen, Lei, Tetreault, Joel, XI, Xiaoming; Towards Using Structural Events to Assess Non-Native Speech; Proceedings of the NAACL HLT 2010 Fifth Workshop on Innovative Use of NLP for Building Educational Applications pp. 74-79; 2010.
Chen, Lei, Zechner, Klaus; Applying Rhythm Features to Automatically Assess Non-Native Speech; Proceedings ol Interspeech; 2011.
Chen, Lei, Zechner, Klaus, Xi, Xiaoming; Improved Pronunciation Features for Construct-Driven Assessment of Non-Native Spontaneous Speech; Proceedings of the North American Chapter of the ACL, Human Language Technologies; pp. 442-449; 2009.
Chen, Lei, Feng, Gary, Joe, Jilliam, Leong, Chee Wee, Kitchen, Christopher, Lee, Chong Min; Towards Automated Assessment of Public Speaking Skills Using Multimodal Cues; Proceedings of the 16th International Conference on Multimodal Interaction; pp. 200-203; 2014.
Higgins, Derrick; Xi, Xiaoming, Zechner, Klaus, Williamson, David; A Three-Stage Approach to the Automated Scoring of Spontaneous Spoken Responses; Computer Speech and Language, 25; pp. 282-306; 2011.
Kapoor, Ashish, Picard, Rosalind; Multimodal Affect Recognition in Learning Environments; Proceedings of the 13th Annual ACM International Conference on Multimedia; pp. 677-682; 2005.
Lamere, Paul, Kwok, Philip, Gouvea, Evandro, Raj, Bhiksha, Singh, Rita, Walker, William, Warmuth, Manfred, Wolf, Peter; The CMU SPHINX-4 Speech Recognition System; Proceedings of the ICASSP; Hong Kong, China; 2003.
Mehrez, Tarek, Abdelkawy, Abdelrahman, Heikal, Youmna, Lange, Patrick, Nabil, Hadeer, Suendermann-OEFT, David; Who Discovered the Electron Neutrino? A Telephony-Based Distributed Open-Source Standard-Compliant Spoken Dialog System for Question Answering; Proceedings of the GSCL; Darmstadt, German; 2013.

(56) References Cited

OTHER PUBLICATIONS

Naim, Iftekhar, Tanveer, M. Iftekhar, Gildea, Daniel, Hoque, Mohammed; Automated Prediction and Analysis of Job Interview Performance: The Role of What You Say and How You Say It; Automatic Face and Gesture Recognition; 2015.

Nguyen, Laurent Son, Frauendorfer, Denise, Schmid Mast, Marianne, Gatica-Perez, Daniel; Hire Me: Computational Inference of Hirability in Employment Interviews Based on Nonverbal Behavior; IEEE Transactions on Multimedia, 16(4); pp. 1018-1031; Jun. 2014.

Pianesi, Fabio, Mana, Nadia, Cappelletti, Alessandro, Lepri, Bruno, Zancanaro, Massimo; Multimodal Recognition of Personality Traits in Social Interactions; Proceedings of the 10th International Conference on Multimodal Interfaces; pp. 53-60; 2008.

Sanchez-Cortes, Diarazalia, Biel, Joan-Isaac, Kumano, Shiro, Yamato, Junji, Otsuka, Kazuhiro, Gatica-Perez, Daniel; Inferring Mood in Ubiquitous Conversational Video; Proceedings of the 12th International Conference on Mobile and Ubiquitous Multimedia; 2013.

Schroder, Marc, Trouvain, Jurgen; The German Text-to-Speech Synthesis System Mary: A Tool for Research, Development and Teaching; International Journal of Speech Technology, 6(4); pp. 365-377; 2003.

Schuller, Bjorn, Steidl, Stefan, Batliner, Anton, Schiel, Florian, Krajewski, Jarek; The INTERSPEECH 2011 Speaker State Challenge; Proceedings of INTERSPEECH 2011, 12th Annual Conference of the International Speech Communication Association; pp. 3201-3204; 2011.

Schuller, Bjorn, Steidl, Stefan, Batliner, Anton, Noth, Elmar, Vinciarelli, Alessandro, Burkhardt, Felix, van Son, Rob, Weninger, Felix, Eyben, Florian, Bocklet, Tobias, Mohammadi, Gelareh, Weiss, Benjamin; The INTERSPEECH 2012 Speaker Trait Challenge; Annual Conference of the International Speech Communication Association; 2012.

Suendermann-Oeft, David, Ramanarayanan, Vikram, Techenbrock, Moritz, Neutatz, Felix, Schmidt, Dennis; HALEF: An Open-Source Standard-Compliant Telephony-Based Modular Spoken Dialog System—A Review and an Outlook; International Workshop on Spoken Dialog Systems (IWSDS); Busan, South Korea; 2015.

Taylor, Paul, Black, Alan, Caley, Richard; The Architecture of the Festival Speech Synthesis System; Proceedings of the ESCA Workshop on Speech Synthesis; Jenolan Caves, Australia; 1998.

Van Meggelen, Jim, Madsen, Leif, Smith, Jared; Asterisk: The Future of Telephony; Sebastopol, CA: O'Reilly Media; 2007.

Witt, Silke; Use of Speech Recognition in Computer-Assisted Language Learning; Unpublished Dissertation, Cambridge University Engineering Department; Cambridge, UK; 1999.

Yuan, Jiahong, Liberman, Mark; Speaker Identification on the SCOTUS Corpus; Journal of the Acoustical Society of America, 123(5); pp. 3878-3881; 2008.

Zechner, Klaus, Higgings, Derrick, Xi, Xiaoming, Williamson, David; Automatic Scoring of Non-Native Spontaneous Speech in Tests of Spoken English; Speech Communication, 51(10); pp. 883-895; 2009.

Ehsani, Farzad, Bernstein, Jared, Najmi, Amir; An interactive Dialog System for Learning Japanese; Speech Communication, 30(2-3); pp. 167-177; Feb. 2000.

Jeon, Je Hun, Yoon, Su-Youn; Acoustic Feature-Based Non-Scorable Response Detection for an Automated Speaking Proficiency Assessment; Proceedings 13th Annual Conference of the International Speech Communication Association, INTERSPEECH; Portland, OR; Sep. 2012.

Prylipko, Dmytro, Schnelle-Walka, Dirk, Lord, Spencer, Wendemuth, Andreas; Zanzibar OpenIVR: An Open-Source Framework for Development of Spoken Dialog Systems; Proceedings of the 14th International Conference on Text, Speech and Dialog, 6836; Pilsen, Czech Republic; pp. 372-379; Sep. 2011.

Ranganath, Rajesh, Jurafsky, Dan, McFarland, Daniel; Detecting Friendly, Flirtatious, Awkward, and Assertive Speech in Speed-Dates; Computer Speech & Language, 27(1); pp. 89-115; Jan. 2013.

Schnelle-Walka, Dirk, Radomski, Stefan, Muhlhauser, Max; JVoiceXML as a Modality Component in the W3C Multimodal Architecture; Journal on Multimodal User Interfaces, 7(3); pp. 183-194; Nov. 2013.

Schreiber, Lisa, Paul, Gregory, Shibley, Lisa; The Development and Test of the Public Speaking Competence Rubric; Communication Education, 61(3); pp. 205-233; 2012.

Suendermann, David, Liscombe, Jackson, Pieraccini, Roberto, Evanini, Keelan; How Am I Doing?: A New Framework to Effectively Measure the Performance of Automated Customer Care Contact Centers; Advances in Speech Recognition; pp. 155-179; Aug. 2010.

Xu, Yushi, Seneff, Stephanie; A Generic Framework for Building Dialogue Games for Language Learning: Application in the Flight Domain; Proceedings of SLATE; 2011.

\* cited by examiner

```
┌─────────────────────────────────────────────────────────────────────┐
│ GENERATE TEMPORAL RECORD OF FIRST BEHAVIOR FEATURES EXHIBITED BY    │
│ FIRST ENTITY DURING INTERACTION BETWEEN THE FIRST ENTITY AND A      │
│ SECOND ENTITY 802                                                   │
└─────────────────────────────────────────────────────────────────────┘
                                    │
┌─────────────────────────────────────────────────────────────────────┐
│ GENERATE TEMPORAL RECORD OF SECOND BEHAVIOR FEATURES EXHIBITED BY   │
│ SECOND ENTITY DURING INTERACTION BETWEEN THE SECOND ENTITY AND A    │
│ FIRST ENTITY 804                                                    │
└─────────────────────────────────────────────────────────────────────┘
                                    │
┌─────────────────────────────────────────────────────────────────────┐
│ DETERMINE THAT A FIRST FEATURE IN A FIRST TEMPORAL RECORD IS        │
│ ASSOCIATED WITH A SECOND FEATURE IN A SECOND TEMPORAL RECORD 806    │
└─────────────────────────────────────────────────────────────────────┘
                                    │
┌─────────────────────────────────────────────────────────────────────┐
│ EVALUATE AN AMOUNT OF TIME THAT OCCURS BETWEEN A FIRST FEATURE AND  │
│ A SECOND FEATURE 808                                                │
└─────────────────────────────────────────────────────────────────────┘
                                    │
┌─────────────────────────────────────────────────────────────────────┐
│ DETERMINE THAT A LENGTH OF TIME SATISFIES A TEMPORAL CONDITION 810  │
└─────────────────────────────────────────────────────────────────────┘
                                    │
┌─────────────────────────────────────────────────────────────────────┐
│ GENERATE A CO-OCCURRENCE RECORD ASSOCIATED WITH A FIRST FEATURE     │
│ AND A SECOND FEATURE 812                                            │
└─────────────────────────────────────────────────────────────────────┘
                                    │
┌─────────────────────────────────────────────────────────────────────┐
│ INCLUDE A CO-OCCURRENCE RECORD IN A CO-OCCURRENCE RECORD DATA       │
│ STRUCTURE 814                                                       │
└─────────────────────────────────────────────────────────────────────┘
```

SYSTEMS AND METHODS FOR DETECTING CO-OCCURRENCE OF BEHAVIOR IN COLLABORATIVE INTERACTIONS

CROSS-REFERENCE TO RELATED APPLICATIONS

The present application claims priority to U.S. Provisional Application Ser. No. 62/304,978, entitled "Novel Features for Capturing Cooccurrence Behavior in Dyadic Collaborative Problem Solving Tasks," filed Mar. 8, 2016.

FIELD

This disclosure is related generally to evaluations of interactions between two or more entities and more particularly to evaluations using verbal and non-verbal behavior features occurring during interactions.

BACKGROUND

While coordinated activities such group problem solving tasks, negotiations, group exercises, evaluations of interpersonal skills, interpersonal training, and team building exercises are often evaluated by direct human observation, or by evaluating the output of the coordinated activity, the amount of insight into those activates that can be gained through direct observation can be limited. First, human observation alone is subject to human induced error and cannot detect all behavioral cues. Second, direct observation is time consuming, whether interactions are observed directly or recorded and later reviewed. And post-interaction evaluations of the coordinated activity's output often fails to correctly weigh individual contribution, instead evaluating a group's output as a whole. Such evaluation techniques have been used in large part out of necessity.

SUMMARY

Systems and methods for computer-implemented evaluation of a performance are provided. In a first aspect, a computer-implemented method of evaluating an interaction generates a first temporal record of first behavior features exhibited by a first entity during an interaction between a first entity and a second entity. Also a second temporal record is generated including second behavior features exhibited by a second entity during an interaction with a first entity. A determination is made that a first feature of a first temporal record is associated with a second feature of a second temporal record. The length of time that passes between the first feature and second feature is evaluated, and a determination is made that the length of time satisfies a temporal condition. A co-occurrence record associated with a first feature and a second feature is generated and included in a co-occurrence record data-structure.

The temporal condition can be a predetermined length of time or the temporal condition can differ based on either a first feature or a second feature. The interaction between the first entity and the second entity can be a collaborative problem solving task or a negotiation. The first feature or the second feature can comprise a plurality of sub-features that occur during a period of time, and the features or the sub-features can comprise verbal cues or non-verbal cues or a combination of verbal and non-verbal features which may comprise verbal and non-verbal cues singly or in combination. Either the first entity or the second entity can be a computer implemented avatar. The behavior features can comprise or indicate prototypical behavior states, and the behavior states can be identified based one or more verbal or non-verbal cues.

Behavior of a first entity and a second entity can be analyzed either during or after an interaction in order to identify first behavior features and second behavior features. Analyzing behavior can include capturing verbal behavior, extracting verbal cues from recorded or captured verbal behavior, processing verbal cues to identify a prototypical behavior state to serve as a first feature or a second feature, and associating a prototypical behavior state with a time in a temporal record of behavior features. Verbal cues can include phonemic qualities of speech, phonetic qualities of speech, prosodic qualities of speech, vocabulary usage, syntactic complexity of speech, response time, verbal non-speech sounds, verbal non-speech qualities, and variations in a rate of speech.

Analyzing behavior can include capturing non-verbal behavior, extracting non-verbal cues from recorded or captured non-verbal behavior, processing the non-verbal cues to identify a prototypical behavior state to serve as a first behavior feature or a second behavior feature and associating a prototypical behavior state with a time in a temporal record. Non-verbal cues can include text based cues, speed of text generation, response time, text based vocabulary usage, spelling, artifacts, and keystroke intensity. Non-verbal cues can also include gestures, posture, environmental interactions, facial expression, response time, direction of gaze, eye focus, and pauses. A behavior feature, or a prototypical behavior state, can be identified by a predetermined combination of verbal and non-verbal cues.

A score, or report, of an interaction, or an interaction output, can be generated based at least on co-occurrence records using a computer scoring model or a computer feedback model. A computer scoring model or a computer feedback model can comprise a number of weighted variables that can be determined by training a respective model relative to a plurality of training data consisting of previously captured interactions. The model may be further trained based on human scoring and feedback of previously captured interactions. The model may be further trained based on computer scored or computer generated feedback of previously captured interactions. A first entity and a second entity interacting may comprise a true dyad or a nominal dyad. Either of a first entity or a second entity can be a computer implemented avatar whose behavior is dictated by computer based intelligence. A score or a feedback report generated based on an interaction can be used to further train a computer based intelligence associated with either a first entity or a second entity. Interactions themselves can occur in person or interactions can occur via a remote network connection while relying on a computer displayed video and computer transmitted audio, and a first temporal record and a second temporal record can be captured either by one or more processing systems collocated with the first entity and the second entity or by a separate and distinct one or more processors remotely located from either entity.

In an interrelated aspect, a computer-implemented system for evaluating an interaction includes verbal or nonverbal behavior capture devices. The system also includes a processing system configured to process data collected by the capture devices to generate a first temporal record of first behavior features exhibited by a first entity during an interaction between a first entity and a second entity. Also a second temporal record is generated including second behavior features exhibited by a second entity during an interaction with a first entity. A determination is made that a first feature of a first temporal record is associated with a second feature of a second temporal record. The length of time that passes between the first feature and second feature is evaluated, and a determination is made that the length of time satisfies a temporal condition. A co-occurrence record associated with a first feature and a second feature is generated and included in a co-occurrence record datastructure.

In an interrelated aspect a non-transitory computer-readable storage medium for evaluating an interaction is provided. The computer-readable storage medium comprises computer executable instructions which, when executed, cause a processing system to execute steps. In executing the steps, a first temporal record is generated to include first behavior features exhibited by a first entity during an interaction between a first entity and a second entity. Also a second temporal record is generated including second behavior features exhibited by a second entity during an interaction with a first entity. A determination is made that a first feature of a first temporal record is associated with a second feature of a second temporal record. The length of time that passes between the first feature and second feature is evaluated, and a determination is made that the length of time satisfies a temporal condition. A co-occurrence record associated with a first feature and a second feature is generated and included in a co-occurrence record datastructure.

BRIEF DESCRIPTION OF THE DRAWINGS

FIG. 8 is a flowchart depicting operations of an example computer-implemented method of evaluating an interaction.

DETAILED DESCRIPTION

Figure 1:
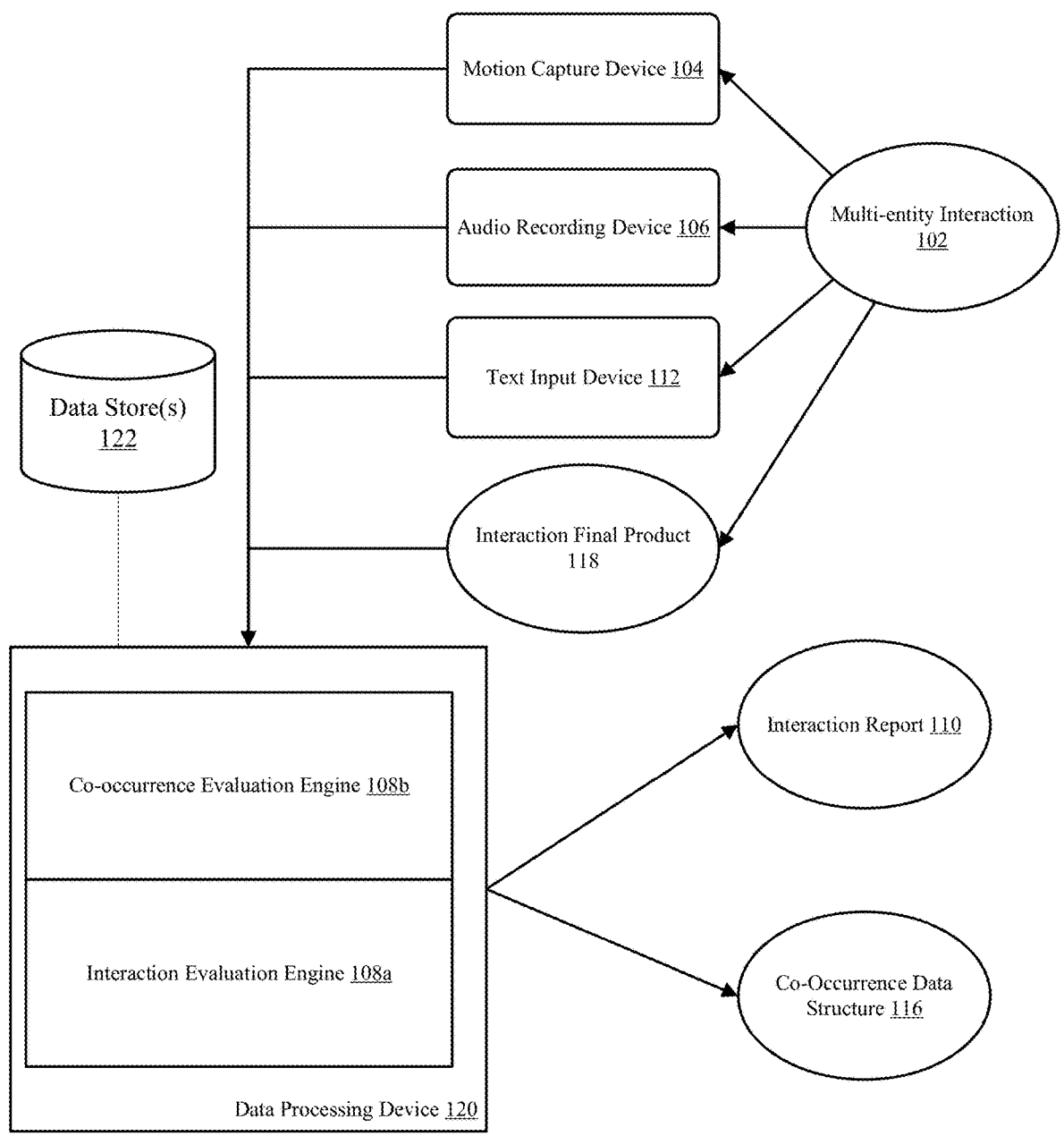
FIG. 1 is a block diagram depicting an interaction evaluation engine for providing a multi-modal evaluation of an interaction.

Complex interactive activities including multiple participates, such as team work and collaborations, are more effective when participants are not only engaged in a task but also when they exhibit behaviors that facilitate interaction. Such successful interactions and collaborations are often manifested by entrainment, which is a convergence between participants of such an interaction or collaboration. In spoken face-to-face communications, entrainment may include synchronization in speaking rate, intonation patterns, or other verbal aspects of behavior of the collaborators. Entrainment may also include non-linguistic, or non-verbal, aspects such as mirroring of gestures, or in text based collaboration, a convergence in word choice or communication styles between participants. The degree of entrainment in a collaborative group engaged in a collaborative or coordinated activity is positively correlated with the overall success of collaboration. And the degree of entrainment can predict a polarity in participant attitudes. In an educational context, entrainment between collaborators, or for example, between a student and a tutor, or between a student and a tutoring system, entrainment is indicative of increased learning, increased learning gain, and overall improvement in student performance. Similarly, entrainment affects or informs the quality of a participants interpersonal skills, negotiations, coordinated activities, and amount of influence one participate has on other participates and the output of the collaborative effort.

Entrainment can be detected and evaluated based on both cognitive and non-cognitive behavior aspects, whether an interaction or collaboration occurs face-to-face or remotely via online or network based interactive activities. Temporal patters of verbal and non-verbal behavior in interactions between entities, be they human-human or human-machine interactions, reveal an attitude toward each entity and these patterns can have an outsized impact on the outcome of the collaborative activities. Typically, if a machine is used to facilitate an evaluation of an interaction, it is used merely to capture the interaction for later human review. Thus an automatic analysis of such interactions is desirable.

In U.S. application Ser. No. 15/133,640, filed on Apr. 20, 2016 and titled "Systems and Methods for Multi-Modal Performance Scoring Using Time Series Features" systems and methods were described for providing an automated, multi-modal evaluation of presentations by generating an automatic score for a presentation by extracting time-series features of the presentation. The time-series features encapsulate information about the temporal evolution of a user's motions and other non-verbal characteristics over the duration of the presentation. For instance, in an example, time-series features take into account the temporal evolution of a user's body posture and facial features (e.g., facial expressions) over the duration of a presentation. Such time-series features are in contrast to time-aggregated features that aggregate information across time. Time-series features are able to explicitly model temporal co-occurrence patterns of a user's motions and other non-verbal characteristics over the duration of the presentation. By contrast, time-aggregated features are unable to model such temporal co-occurrence patterns. The above mentioned U.S. application Ser. No. 15/133,640, filed on Apr. 20, 2016, is hereby incorporated by reference in its entirety as if fully set forth herein. The time-series and time-aggregated features disclosed therein are extended to evaluate various behavioral features generated over time by a plurality of individuals during an interaction, and co-occurrences of behavior features in separate individual behavior patterns are detected and evaluated.

A time-series feature, such as co-occurrence of an individual's behavior features (i.e. either time-aggregated or time-series) in a co-participant at some later time, may be represented by a histograms of co-occurrences that models how different verbal patterns, motions and other non-verbal characteristics, or cues, co-occur in different individuals within different time lags of each other over the course of an interaction. Such histograms of co-occurrences are described in further detail below as applied to co-occurring behavior in a multi-entity interaction. When a co-occurrence of behavior features occurs within certain period of time, or with a particular time lag, this is indicative of entrainment, and where few or no occurrences of behavior occur this indicates a lack of entrainment occurring during the interaction. This entrainment or lack thereof, and the particular ways in which it manifests itself, or not, indicates information about the quality and nature of the interaction, and provides a basis for feedback about the interaction or about the output of the collaboration.

The time-series features of the instant disclosure may be used in the context of computer-implemented systems and methods that provide automated, multi-modal scoring of interactions based on both (i) non-verbal features of interactions that are based on data collected by a motion capture device or an input device, and (ii) audio features—including verbal features—of interactions that are based on data collected by an audio recording device. In a collaboration, for example, a coordinated activity involving a dyadic interaction between two entities, each entity's behavior or behavioral state need not stay constant throughout the interaction. Where one of the dyadic entities is a human, they may become fatigued over time, or may be more nervous in one stage of the interaction than in another stage of the interaction. This nervousness, as one example, may manifest itself in repetitive, cyclic fidgeting behavior, or particular speech patterns. Where one of the entities is an avatar, it may suffer from inadequate human behavioral modeling and may not respond accurately to human behavioral cues—and for example may miss a human student's cue indicating sudden understanding. This may occur due to lack of training, or unfamiliarity with each other. Overtime, however, whether the interaction is human-human or otherwise, the dyadic entities may gradually settle into a comfortable interaction as they come to know each other, or begin to sense or perceive each other's behavioral cues. These behavior cues, or features, may therefore fluctuate over time, and may begin to follow each other collaborator's behavior patterns. For example, one person's emotional state of joy may follow an interlocutor's emotional state—for example a neutral state—in a definitive pattern during portions of an interaction. Also, a single behavior feature may comprise multiple time-series or time-aggregated sub-features, for example a gesture followed by an utterance within a particular period of time may together constitute a single behavior feature indicative of a specific emotional condition or behavior state. Features may generally be indicative of prototypical behavior states, and also can be specific behavior states of a known individual (e.g. one who's behavior has been monitored or capture and analyzed to identify particular emotional or behavioral states). Individualized behavior features can also be recognized in real time during the interaction and then tested for either in real time or in later analysis.

A technological solution to capturing and modeling co-occurrences of behavior during an interaction between two or more participants allows for an automated prediction of different behavioral features in an interaction. This further allows generating features that are interpretable, thereby enabling improved scoring and improved feedback tailored to temporally distinct portions of an interaction and any related affect on specific aspects of the output of the collaboration. By identifying template emotional states, or prototypical behavior states, of each entity engaged in a collaborative interaction, and the temporal evolution of emotional states over time, automatic analysis of collaborative behavior is enabled, and tailored feedback can be generated.

FIG. 1 is a block diagram depicting an exemplary interaction evaluation engine 108*a* and a co-occurrence evaluation engine 108*b* for providing a multi-modal evaluation of an interaction between multiple entities engaged a coordinated activity, or a collaborative task. The behavior of the participants of a multi-entity interaction 102 is captured by a number of sensors, for example by motion capture device 104 configured to capture non-verbal behavior of participants to the interaction 102. As referred to herein, the term "interaction" encompasses various types of activities. The presentations referred to herein may include, for example, job interviews, group presentations made as part of a performance-based assessment, negotiations, coordinated activities, collaborative educational tasks, collaborative problem solving tasks, team work, group assignments, and similar tasks involving multiple entities engaging with each other. An audio recording device 106 is configured to capture audio features of the participants to the interaction. Also, when the interaction involves text based interactions, one or more text input device(s) 112 is configured to capture key strokes and text entry over time, including submitted texts and also non-submitted texts (e.g. text entered but deleted and not sent to a collaborator). Additionally, a multi-entity interaction may generate some output, like interaction final product 118, that may be an educational project, a report, or a solution to a collaborative problem. This output 118 may be relied upon by the interaction evaluation engine 108*a* and the co-occurrence engine 108*b*. The interaction final product 118 may also include information indicating how the product evolved overtime, allowing the interaction evaluation engine 108*a* and the co-occurrence engine 108*b* to identify aspects or features of the interaction that led to particular parts of the output 118, and to identify correlations between the interaction 102 output 118 and particular portions of the work product 118.

Outputs from the motion capture device 104 and the audio recording device 106 and the text input device 112 are provided to a data processing device 120 that includes a co-occurrence evaluation engine 108*b*. Based on those outputs, the co-occurrence evaluation engine 108*b* is configured to generate a record of co-occurrences, that may be stored in, for example, a co-occurrence data structure 116. The co-occurrence data structure 116 may also be supplied to an interaction evaluation engine 108*a*, which receives the co-occurrence records, and other relevant information, and generates an interaction report 110. The interaction evaluation engine 108*a* may also receive the output, or final product, 118 of the interaction 102, and may include specific feedback on the output 118 based in part on the co-occurrence record 116. Alternatively, the co-occurrence evaluation engine may pass detected co-occurrence of behavior directly to the interaction evaluation engine 108*a* which then stores the detected behavior in a data record. In embodiments, the co-occurrence evaluation engine 108*b* and the interaction evaluation engine 108*a* are a single engine or process instead of two separate engines or processes.

One or more data store(s) 122 may be relied upon to store generated interaction reports 110 and generated co-occurrence data structures 116. The data store(s) 122 may also store other necessary data for performing the various functions. For example, the data store(s) 122 may contain weighting data for scoring models relied upon by the scoring engine 108*a*, as well as historic interaction reports and historic co-occurrence data structures. For example, when one or more of the participants of the multi-entity interaction 102 have previously been observed by a behavior identifying system, a record of participants' behavior may be stored and relied upon to extract specific behavioral features that have previously been identified as indicative of one or more emotional states of that user. For example, when a person exhibits a particular combination of behavioral features, such as throat clearing contemporaneous with certain fidgeting behavior, this may be detected and stored in a data store 122. Stored features can allow the system to attempt to identify co-occurrence behavior in other participants responsive this previously identified combination of behavioral features specific to the participant.

The interaction evaluation system may include various components. In various embodiments, motion from an interaction 102 is detected by a motion capture device 104 (e.g., digital values, voltages, video imagery). In one example, the motion capture device 104 includes a depth measurement device (e.g., a Microsoft Kinect device, infrared sensor, etc.) that captures measurements of the distance of objects from a sensor (e.g., a digital depth measurement value for each pixel of an array of pixels) and thus, depth information that can be utilized to analyze motion of the participants. In another example, the motion capture device 104 is a video camera (e.g., a high-definition video camera), where marker-based motion capture is performed based on anchor points identified at certain positions of the participants. As those anchor points move from frame-to-frame of captured video, motion measurements can be obtained. In another example, the video camera is utilized to measure facial expressions and changes in facial expressions throughout the presentation. Where an entity in the interaction 102 is an avatar, these measurements devices can alternatively be simulated and the relevant motion data generated by simulation. Or, the avatar controller may simply output behavioral features to the co-occurrence engine directly in synchronization with the temporally varying depiction of the avatar in the interaction 102.

An audio recording device 106, which may include a microphone, is configured to capture audio of the user presentation 102 for downstream processing. In one example, the audio of the user presentation 102 is captured using a microphone of a device, such as a camcorder, that is also acting as the motion capture device.

In one example, multimodal data of the user presentation 102 is collected using the following equipment and software tools: (a) Microsoft Kinect (Windows Version 1) for recording three-dimensional (3D) body motions, (b) Brekel Pro Body Kinect tracking software (v1.30 64 bit version) for recording 58 body joints' motion traces in the Biovision hierarchical data format (BVH), and (c) a JVC Everio GZHM35BUSD digital camcorder for audio/video recording. In examples, the camcorder is mounted together with the Kinect on a tripod. It is noted that this particular configuration of hardware and software is only an example, and that other motion capture devices, audio recording devices, and software tools are used in other examples. Alternatively, where two participants are engaged in an interaction remote from each other, the motion and audio capture devices may be a camera and microphone associated with a participants PC, and the system may further obtain behavior data in the form of text input using a text input device 112, such as a key board, or other non-verbal input devices, such as a stylus or mouse.

Outputs of the motion capture device 104 and the audio recording device 106, and any other behavior input devices, e.g. 112, are provided to a co-occurrence evaluation engine 108b and an interaction evaluation engine 108a for processing and downstream generation of a co-occurrence record, or data structure, 116 or an interaction report 110. In examples, the one or more behavior features include a time-series feature. To extract the time-series feature, the engines 108a, 108b process data collected by the behavior capture devices 104, 106, 112 to identify occurrences of multiple different types of actions by the participants. For instance, the co-occurrence evaluation engine 108 may process the data collected by the motion capture device 104 to identify occurrences of various (i) gestures made by a participant during the interaction 102, (ii) postures of a participant during the interaction 102, (iii) facial expressions a participant of the interaction 102, and (iv) eye gazes of a participant during the interaction 102 (i.e., eye gazes of certain directions, eye gazes that are not directed toward the other participants, etc.). The combinations of features may be indicative of emotional states of the participants, and combinations of such features occurring contemporaneously may further indicate a particular emotional state.

The types of actions identified by the co-occurrence engine 108b may further include combinations of different gestures, postures, facial expressions, and eye gazes (e.g., a type of action identified by the co-occurrence engine 108b may be a "folded hands" gesture in combination with a "slumped" posture, etc.). In identifying occurrences of these types of actions, or cues, the co-occurrence engine 108b may process the data generated by the motion capture device 104 in various ways. For example, depth measurements from the motion capture device 104 could be used to detect occurrences of various gestures (e.g., hand gestures) during the interaction. In another example, magnitudes of pixel value changes or rates of change of pixel value changes between frames of a video could indicate occurrences of various movements by the user. As another example, an occurrence of a non-verbal posture (or head position/orientation) could be identified based on analysis of video footage of the user interaction 102. For example, changes in relative distances among anchor points on the user during the interaction 102 could indicate slouching at certain portions of the presentation, which may indicate one or more emotional states. As a further example, occurrences of eye contact and facial expression actions could be identified, such as through analysis of high-definition video taken during the interaction 102, which indicate demeanor of the participants and the appropriateness of eye contact between two participants. Occurrences of other non-verbal actions (e.g., smiles responsive to eye contact, other combinations of gestures and postures, an action or facial expression indicating the user's mood, etc.) could also be extracted. The co-occurrence engine 108b generates a temporal record of these features for each participant during the course of an interaction 102.

In examples, the co-occurrence evaluation engine 108b processes the data collected by a motion capture device 104 to generate a temporal record of behavioral features, or cues, by identifying occurrences of types of actions by participants that are based on the user's head pose, eye gaze, and facial expressions. A participant entity's engagement with a co-participant entity can be evaluated based on various head postures and eye gazes directed towards their co-participants (or not). Thus, in examples, the co-occurrence evaluation engine 108b identifies occurrences of actions that target these aspects of the interaction 102. Head postures are approximated using the rotation attribute (i.e., pitch, yaw, and roll) of the head through a head and face tracking engine (e.g., Visage's SDK FaceTrack1), in examples. The tracking may be activated if and only if the detector has detected a face in a current frame, in examples. Additionally, in examples, gaze directions are approximated through the gazeDirectionGlobal attribute of the Visage tracker SDK, which tracks gaze directions taking into account both head pose and eye rotation. Note that, different from head rotation, gaze directions represent estimated "eyeball" directions regardless of head postures, and can potentially measure a participant's level of engagement with the co-participants. Thus, in examples, the time evolution of basic head pose measurements (Cartesian X, Y, Z coordinates along with pitch, yaw, and roll) as well as gaze tracking information over the entire interaction 102 are used in computing the temporal record of a participant's behavior.

Facial expressions from participants also contribute to an effective interaction. Facial expression can be non-verbal cues indicating a particular emotional state or behavioral state. Thus, in examples, the co-occurrence engine 108b utilizes an emotion detection toolkit (e.g., Emotient's FACET SDK2) to analyze facial expressions. In examples, the emotion detection toolkit outputs the intensity (e.g., ranging from 0 to 1) and confidence values for seven primary emotions (i.e., anger, contempt, disgust, joy, fear, sadness, and surprise). The co-occurrence engine 108b generates a temporal record of such feature based on the time-evolution of the estimated intensities of the different emotional states for the interaction 102. The co-occurrence engine 108b generates a temporal record for each participant during the course of an interaction 102. The detected non-verbal features may include various other features, or cues, in some examples. For example, occurrence, frequency, and speed of body movement, gestures, eye movement, head turning, etc., can be determined by the co-occurrence engine 108b, such as from successive frames of captured video imagery using suitable image processing methods including conventional image processing methods and algorithms. Each of the detected behavioral features may indicate, alone or in combination with other features, an identifiable emotional state, or an identifiable prototypical behavioral state.

Verbal and audio behavioral features can also affect how an interaction evolves. As participants interact, their verbal communications are captured by audio recording device 106. This captured audio is then analyzed by a co-occurrence evaluation engine 108b to extract audio features which are then added to the temporal record of the relevant participant. Similarly, when interactions occur via a remote interaction involving typing on a text input device 112, or other non-verbal input devices, qualities of input can be measured and behavioral features identified and incorporated in the temporal record. It will be appreciated that the temporal record may include all of the raw input from all of the input devices 104, 106 and 112, and the temporal record can be later analyzed to extract desired behavioral features.

The co-occurrence evaluation engine also extracts one or more audio features, or cues, such as verbal features, using data from the audio recording device 106. Audio features utilized by the co-occurrence evaluation engine 108b may be content-based features or non-content-based features. For example, an audio feature may measure a quality of content spoken by a participant in the interaction 102. In such an example, the captured audio is provided to an automatic speech recognizer that generates a transcript of the each participant's contributions to an interaction 102. To analyze the content of an interaction 102, the transcript can be compared to other model transcripts, or to previously captured interactions, compared to a prompt presented to the participants to set up the interaction, or another constructed response scoring techniques can be used, such as techniques that use natural language processing or latent semantic analysis to compare texts. Certain non-content based audio features can utilize a transcript (e.g., an automatic speech recognizer transcript or a manual transcript) to generate an audio feature. For example, an audio feature could measure pronunciation of words by a participant in an interaction 102 by comparing sounds produced by the presenter at certain points of the presentation, as captured by the audio recording device 106, and proper pronunciations of words identified at in an assignment prompt. Other non-content transcript based metrics could indicate levels of vocabulary and grammar used in the interaction 102. Other non-content, delivery-type metrics can be determined without use of a transcript (although an automatic speech recognizer may still be used to generate the metrics). For example, fluency and prosody can be measured by observing stresses, accents, and discontinuities (e.g., pauses, hesitations, use of filler words, false starts, repetitions) in audio captured of the interaction 102.

In examples, the one or more audio features, or cues, extracted and considered by the co-occurrence evaluation engine cover measurements including lexical usage, fluency, pronunciation, prosody, grammar, audio quality, and so on. Further, in examples, the co-occurrence evaluation engine 108b uses a speech rating system (e.g., the SpeechRater system) that processes speech and an associated transcription to generate a series of features on multiple dimensions of speaking proficiency, e.g., speaking rate, prosodic variations, pausing profile, and pronunciation, which may be measured by Goodness of Pronunciation (GOP) or its derivatives. The SpeechRater system, which may be used by the co-occurrence engine 108b in extracting the one or more audio features, is described in detail in "Speechrater: A construct-driven approach to scoring spontaneous non-native speech," by Zechner et al., Proc. SLaTE (2007), and "Automated Scoring of Spontaneous Speech Using SpeechRater v1.0," by Xi et al. (Research Report, November 2008), which are incorporated herein by reference in their entireties.

One or more non-verbal features and/or one or more audio features can be combined to generate temporal record of behavior features for each participant. From these temporal records, co-occurrences of behavior features between participants can be identified. Once co-occurrences of behavior are identified, an interaction evaluation can be generated based on the co-occurrence records. For example, the interaction evaluation engine 108a may receive the co-occurrences which can be weighted to generate the interaction report 110, where such weights can be generated through analysis of human scored presentations and for example stored in data store(s) 122, and where such evaluation includes an analysis indicates correlations between co-occurrence of features during the interaction and an evaluation of the interaction final product 118. In examples, the interaction evaluation engine 108a automatically generates the report 110 by applying a computer scoring model (e.g., a statistical computer model) to the one or more non-verbal features and to the one or more audio features. The computer scoring model may comprise a portion of the interaction evaluation engine 108a for automatically scoring the interaction 102 without human intervention (or requiring only minimal human intervention).

Figure 2:
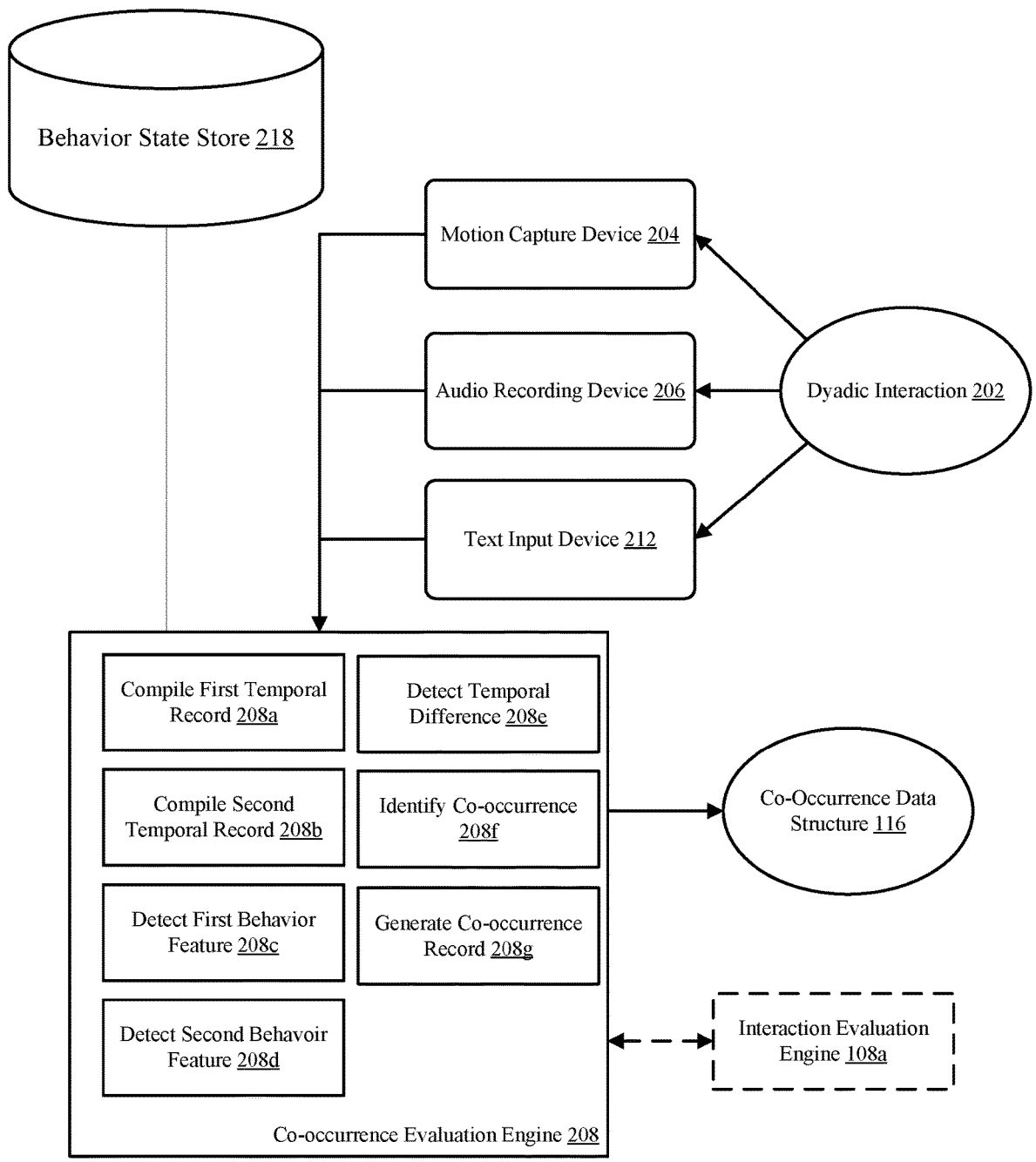
FIG. 2 is a block diagram depicting example components used in implementing an interaction evaluation engine.

FIG. 2 is a block diagram depicting operations of a co-occurrence evaluation engine 208. Similar to the example of FIG. 1, a multi-entity interaction, in this exemplary case a dyadic interaction 202 is captured by a motion capture device 204 configured to non-verbal motion of the participants in the dyadic interaction 202. An audio recording device 206 is configured to capture audio of the participants of the interaction 202. A text input device 212 captures the text input of the participants to the interaction 202. Outputs from the motion capture device 204 and the audio recording device 206 and the text input device 212 are provided to a co-occurrence evaluation engine 208.

The co-occurrence evaluation engine 208 includes one or more data processors that are configured (for example, by instructions held in one or more memory structures) to extract behavioral features of the participants of the interaction 202 and to generate, for each participant, a temporal record 208a, 208b of participant behavior based on data collected by the behavior capture devices 204, 206, 212. The co-occurrence evaluation engine 208 is further configured identify co-occurrences of behavior features between participants. For example, based on the first temporal record 208a, the co-occurrence evaluation engine detects a first behavior feature 208c in the first temporal record 208a. The co-occurrence evaluation engine 208 then identifies a second behavior feature 208d that occurs in the second temporal record 208b. The co-occurrence evaluation engine 208 then determines the temporal difference 208e between the detected first behavior feature 208c and the detected second behavior feature 208d, and if the temporal difference, or time lag between the occurrences 208c, 208d, satisfies a condition, for example a temporal condition such as two or more features occur within three seconds of each other, then the co-occurrence evaluation engine identifies a co-occurrence of the behavioral features between the relevant participants. The co-occurrence engine 208 can also identify missed co-occurrence opportunities, for example when the co-occurrence engine identifies a state of enthusiasm by one participant, but no response from another participate, this missed co-occurrence opportunity may be included in an output co-occurrence data structure 116.

Having detected a co-occurrence of behavior, the engine may then generate an output co-occurrence record 208g. This output may be in the form of a co-occurrence data structure 116 that contains information relevant to, and descriptive of, the detected co-occurrence 208f. The co-occurrence occurrence data structure 116 can include a single co-occurrence record, or multiple co-occurrence records. Similarly, a single co-occurrence data structure 116 can include a co-occurrence satisfying a single condition, a co-occurrence satisfying multiple conditions, or multiple co-occurrences each of which may satisfy a single condition or multiple conditions. A co-occurrence record, or data structure 116, may include data about how the co-occurrence was detected, the time lag between the two, the times in the first and second temporal records 208a, 208b at which each feature was detected 208c, 208d, which condition was satisfied by the co-occurrence, or a behavioral state that is associated with the co-occurring behavioral features. This information may be further, or alternatively, forwarded to the interaction evaluation engine 108a. The co-occurrence evaluation engine may rely on data stores for identifying and generating co-occurrence records. For example, the co-occurrence engine may refer to a data store containing prototypical behavior state information 218, where such information includes behavioral features that should be included in the first and second temporal records. Relying on this information allows the co-occurrence engine to filter behavior that is not indicative of relevant emotional states, or prototypical behavior states. This information may also allow the engine 208 to focus on those behavior features that are preferably for evaluating entrainment. Alternatively, where the evaluation seeks to measure other qualities of the interaction 202, the behavior state store 218 may include the desired behavior features for evaluation. Also, the behavior state store 218 may include personalized data about a particular participant that associates certain detectable behaviors to behavior states relevant to the evaluation.

Figure 3:
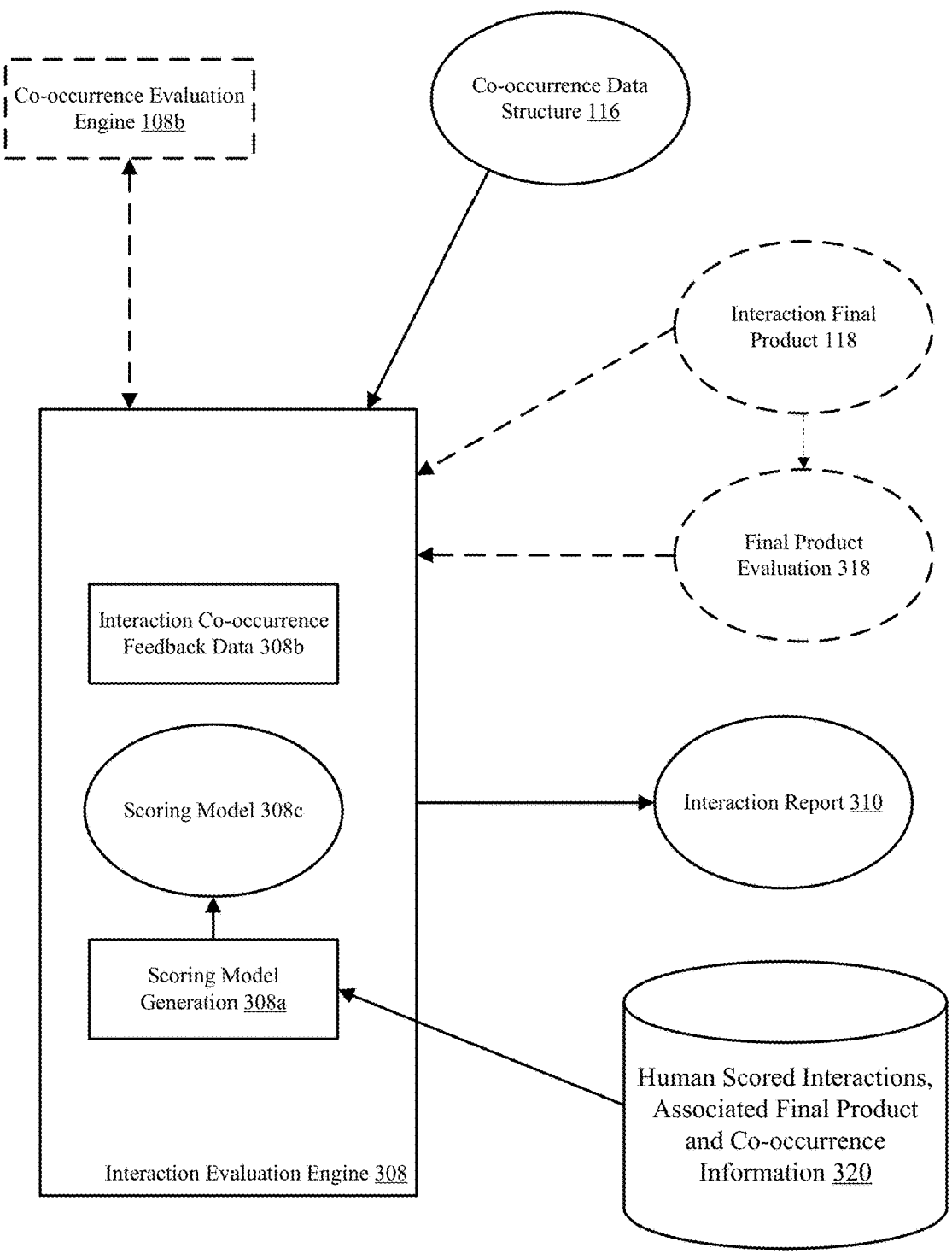
FIG. 3 is a block diagram depicting example components used in implementing an interaction evaluation engine.

FIG. 3 is a block diagram depicting operations of an interaction evaluation engine 308. The interaction evaluation engine 308 receives information regarding co-occurrences, such as co-occurrence data structure 116, and generates an interaction report 310 based on the co-occurrence information. The interaction report can include feedback tailored to each individual based on their contributions to the co-occurrence of behavior. For example, a co-occurrence record is indicative of a high level of entrainment, a report 310 may be generated detailing specific co-occurring features that are indicative of the high level of entrainment. Similarly, a missed co-occurrence noted by the co-occurrence evaluation engine, e.g. 208, can cause the interaction evaluation engine 308 to generate feedback tailored to an individual who had missed an opportunity to improve entrainment by missing behavioral cues by co-participants. Such feedback can include guidance on how to improve performance in a collaborative environment, or in a negotiation, a discussion, or an interview. The interaction evaluation engine 308 may also receive the interaction final product 118, or a final product evaluation 318 prepared by a human grader or an autonomous grader. Relying on the final product 118, or a final product evaluation 318, the interaction evaluation engine 308 may tailor the report by associating co-occurrence feedback with particular results of the interaction. For example, where the group reaches a high level of entrainment during one portion of the interaction that resulted in an especially strong final product, feedback in a resulting interaction report can indicate this correlation. Where another part of the interaction resulted in low entrainment, and a poor portion of the final product 118, or a poor portion of the evaluation 318, this can also be annotated in the interaction report 310. Comparisons and contrasts can be automatically drawn between the qualitative differences between aspects of the interaction having differing quality output.

The interaction evaluation engine 308 is able to generate one or more scores indicating the groups', and each individual participant's strengths in a collaborative environment. Such a score can be generated by a scoring model 308c that is generated 308a based on previously scored interactions that may include such things as previously associated final products and final product evaluations, and historic co-occurrence records associated with previously score interactions. This historic data may be stored in a data store, or data repository, 320. Additionally, the interaction report 110 may include feedback data 308b that is tailored to particular levels of attained entrainment, or particular shared emotional states, or shared prototypical behavior states. The interaction evaluation engine 308 may receive a single complete record of co-occurrences from a co-occurrence evaluation engine 108b, or it can operate in communication with the co-occurrence engine 108b during the interaction thereby generating feedback in real time. In embodiments, the co-occurrence evaluation engine and 108b and the interaction evaluation engine 108a may operate to generate a histogram of co-occurrences which can be relied upon when generating a score or report 110, 310.

In embodiments the co-occurrence record or data structure, e.g. 116, that is based on such counts may be a "histograms of co-occurrence" ("HoC") feature. In alternative embodiments, a HoC can be generated from the co-occurrence record or data structure 116. As described above, the histograms of co-occurrence feature is based on counts of the number of times that different types of actions (e.g., body postures, gestures, facial expressions, eye gazes, etc.) co-occur between participants with each other at different time lags (e.g., different values of T) over the course of the an interaction 102, 202. The histograms of co-occurrence feature encapsulate information about the temporal evolution of each participant's motions and other non-verbal characteristics over the duration of the interaction 102, 202. Modeling of this temporal evolution in the histograms of co-occurrence feature may be advantageous because it takes into account the fact that the participants' interaction levels may not be constant over the course of the presentation 102, 202. For example, the user may get fatigued over time, or be more nervous at the beginning of the interaction, (e.g., thus resulting in repetitive, cyclic fidgeting behavior, etc.), or be unfamiliar with their co-participants, but then gradually settle into a comfort zone later. Conventional scoring approaches that aggregate information across time are not able to model this temporal evolution, in contrast to the systems and methods described herein. The systems and methods described herein may thus result in richer features than those used in the conventional, time-aggregated approaches of evaluating a collaborative effort.

The conventional scoring approaches are also not able to model temporal co-occurrence patterns. An example temporal co-occurrence pattern is, for example, a pattern of a certain prototypical behavior states, or emotional states, indicated by certain behavioral features following a co-occurrence of the behavioral feature in a co-participant. Capturing such patterns is useful in (i) explicitly understanding the predictive power of different features (such as the co-occurrence of a given emotion) in temporal context (such as how often did this emotional state co-occur given the previous occurrence of another emotional or behavioral state), thus permitting (ii) obtaining features that are more interpretable and predictive of outcome. In contrast to the conventional approaches, the histograms of co-occurrence feature of the systems and methods described herein explicitly encapsulate information regarding temporal co-occurrence patterns. Thus, for example, the histograms of co-occurrence feature is able to model how often a certain prototypical body posture (e.g., folded hands) in one participant follows a second prototypical body posture (e.g., an open stance) of another participant in a pattern during different parts of the presentation 102, 202. These postures may indicate predictable emotional response in individuals generally or in a particular participant.

Figure 4:
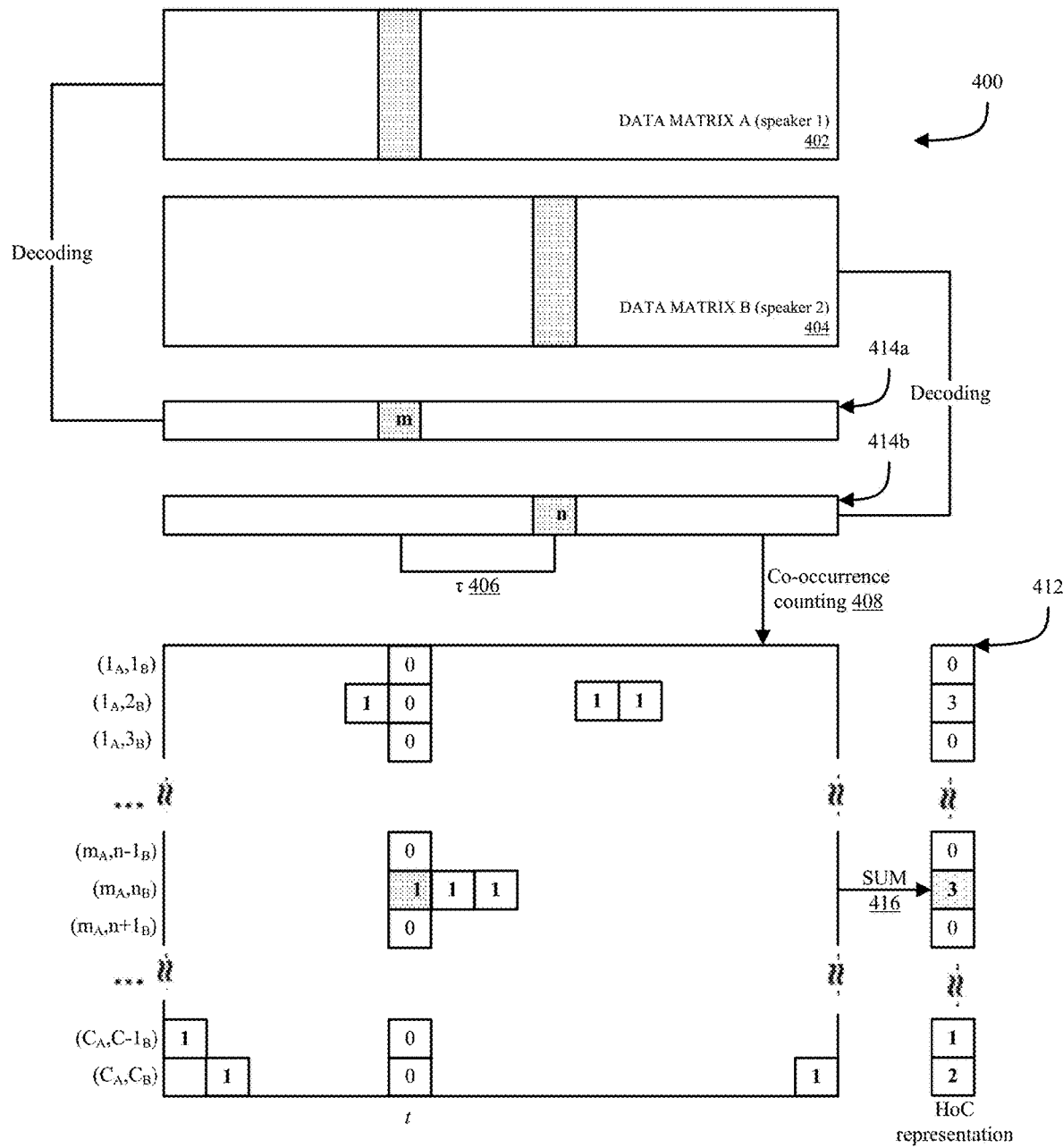
FIG. 4 is a schematic depiction of the computation of histograms of co-occurrences for a given interaction.

FIG. 4 is a schematic depiction 400 of the computation of histograms of co-occurrences. In embodiments, a HoC is computed for a group interaction. The HoC feature can be applied to any multivariate time-series data and is particularly useful for evaluating co-occurrences of behavioral features between participants in an interaction. The aspects of the interaction evaluation systems herein may generate data streams that are compiled into temporal behavior records for each participant. The HoC feature comprises a single high-dimensional feature vector that is computed for each temporal record of each participant, in examples. A HoC can be generated for each type of monitored behavior feature, or a single HoC can be generated that includes co-occurrence vector data for all co-occurring behaviors. In examples, for instance, the HoC feature is computed for behavioral features detected using FACET SDK, a computer expression recognition toolbox, which identifies features using facial action units that are described in the Facial Action Coding System. FACET detects human faces in a video frame, locates and tracks facial features and uses support vector machine based classifiers to output frame-by-frame detection probabilities of a set of facial expressions: anger, joy, contempt, surprise, etc. The use of the HoC feature vector may be advantageous because it explicitly encapsulates information regarding temporal co-occurrence patterns. Thus, for example, this feature is capable of modeling how often a certain prototypical behavior state, or a particular behavioral feature, of one participant follow another prototypical behavior state or feature of another participant in a definitive pattern during various parts of the presentation.

In computing a HoC feature, the number of times different behavioral features co-occur with each other at different time lags over the course of the time series are counted. Such behavior features may include gestures, head postures, eye gazes, and facial expressions, as described herein, among other postures. The example shown in FIG. 4 illustrates a temporal record of features for person A 402, and a temporal record of features for person B 404 based on captured FACET data. Based on these temporal records a co-occurrence count 408 is performed over time for a chosen lag value $\tau$ 406 and a time step t, for labels m corresponding to a first person (A) and n corresponding to a second person (B) occurring $\tau$ time steps apart (highlighted). Thus, a corresponding entry of the lag-$\tau$ co-occurrence matrix corresponding to row (m,n), and the $t^{th}$ column with a "1" (which is also highlighted for exemplary purposes). Note that (m,n) correspond to indices for (Person A, Person B).

Once this matrix is generated, the sum 416 of each row is tallied (across time) to obtain the lag-$\tau$ HoC representation of co-occurrences of behavior features that occur within $\tau$ time steps of each other. In examples, the input temporal behavioral record matrices A and B comprise captured behavior features, for example, from a motion capture device and associated software. Each behavior in the temporal behavior record is identified and replaced with a protypical behavior state label. In replacing each frame of data of the input matrices A and B with a best-matching cluster label, each frame is matched to one of the identified prototypical behavior states for example. Thus, in FIG. 4, the label "m" may be associated with a facial expression associated with "joy" in person A, and the label "n" may be associated with a facial expression associated with "positive" for person B, for instance. As can be seen from FIG. 4, these respective emotional states are observed $\tau$ frames apart in the input data.

While here the exemplary detected behavior are not identical emotional states, it may be determined that a particular state in person A followed by a verbal feature in person B may also be significant for evaluating an interaction, or any combination of one feature following another can be observed and the materiality of such a combination of co-occurring features can be significant depending on the purpose of the evaluation, the underlying interaction, the participants involved, or depending on other identifiable features of the interaction (e.g. what is being tested).

Continuing the example of FIG. 4, a HoC-representation of lag $\tau$ is then defined as a vector 410 where each entry corresponds to the number of times all pairs of cluster labels are observed $\tau$ frames apart. Where a cluster label signifies an observed behavioral feature to be observed, and the co-occurrences with other behavior features within time lag $\tau$. In other words, a vector of lag-$\tau$ co-occurrences 410 is constructed where each entry (m, n) signifies the number of times that the input sequence of behavior features is encoded into a cluster label m at time t (in the single-row vector shown at 414a), and subsequently the occurrence of another monitored behavior feature occurs within cluster label n within time t+τ (in single-row vector shown at 414b). In the vector 410, different rows represent different pairs of cluster labels (e.g., different pairs of prototypical body gestures), and different columns represent different times t. Thus, for instance, entries of a row (1, 1) are representative of instances of an occurrence of a prototypical body posture "1" in person A following another occurrence of the prototypical body posture "1" in person B with the occurrences occurring within time τ of each other. Likewise, for instance, entries of a row (1, 2) are representative of instances of an occurrence of a prototypical body posture "2" in person A following an occurrence of the prototypical body posture "1" in person B with the occurrences occurring within time τ of each other. It is noted that a number of rows in a vector 410 may be equal to $C^2$ (i.e., C*C), where C is the number of clusters (i.e., the number of different body postures analyzed in the input data).

By stacking all (m, n) combinations, each interval can be represented by a single column vector 412, where the elements of the column vector 512 express the sum of all $C^2$ possible lag-τ co-occurrences. The procedure is repeated for different values of τ, with the results being stacked into one "supervector." An example of such a supervector may contain a similar column vector of data for τ=1, 2, 3, 4, 5 and two cluster labels A and B. The dimensionality of the HoC feature vector increases by a factor of $C^2$ for each lag value τ under consideration. In one example, four lag values of 1 to 10 frames (corresponding to 100-1000 ms) are utilized.

The features illustrated in FIG. 4 identify co-occurrences of behavioral features that occur first in person A and then subsequently in person B within a time period τ. The behavioral features depicted are cluster centroids derived from simple K-means clustering on the space of emotional states (or FACET features) that represent prototypical states. This clustering of FACET features was performed on all interactions in an observed data set comprising 26 participants paired into 13 true dyadic interactions. While different cluster sizes were modeled (8, 16, and 32) it was determined that 16 clusters was a preferred number of clusters. In experimentation, increasing the number of clusters resulted in repeated cluster centroids, while decreasing the clusters missed out on some clusters centroids. A HoC-representation of lag τ was then generated where each entry corresponds to the number of times all pairs of cluster labels are observed τ frames apart for each pair of subjects. In each case, the vector is prepared twice in which case each person in the dyadic pair serves as both person A and person B as illustrated in FIG. 4. By stacking each combination of (m,n) combinations, each interval can be represented by a single column vector where the elements express the sum of all C2 possible lag-τ co-occurrences, where C is the number of clusters of behavior features). This is repeated for multiple values of τ, for example four values of τ from 0 to 3 captured video frames apart. The results are then stacked to form a supervector in order to capture behavioral convergence or divergence within a 3 second window.

In one example, 100 randomly extracted 10 second-long time intervals were selected from the temporal behavioral records generated, e.g. 208a, 208b, for the 26 exemplary participants. A HoC co-occurrence record, or data structure, was generated for each participant interval paired with each other participant, only one of which other participant was part of the true dyadic pair for that participant. (That is, for each person serving as person A in FIG. 4, an 25 HoCs were computed, one for each of the other 25 participants serving as person B in FIG. 4, only one of which was the true person B in the actual dyadic interaction). For each case of a person A, when the person B was the true dyadic participant, the co-occurrence distances were computed for each of 100 HoC features computed for the true dyad. For each case of a person A, when the person B was not part of the true dyadic interaction involving person A, the distances were computed between HoC features computed on that participant and each of the other 24 candidate dyads in the pool of participants. A Wilcoxon rank-sum test[2] was then applied to test to verify that median distance distributions computed in each case remained equal. The results, shown in Table 1, illustrate the mean and standard deviation of distances between HoC features computed between true dyadic interactions and between the false pairing combinations of participants (referred to as "nominal dyads").

TABLE 1

Means and standard deviations of distances between HoC features computed between dyads and nominal dyads of each speaker.

| Speaker | (True) Dyad | | Nominal Dyad | |
|---|---|---|---|---|
| | Mean | Std | Mean | Std |
| 1 | 0.25 | 0.50 | 1.66 | 0.41 |
| 2 | 0.25 | 0.50 | 1.60 | 0.50 |
| 3 | 0.29 | 0.38 | 1.30 | 0.44 |
| 4 | 0.29 | 0.38 | 1.48 | 0.41 |
| 5 | 0.28 | 0.42 | 1.24 | 0.53 |
| 6 | 0.28 | 0.41 | 1.49 | 0.49 |
| 7 | 0.26 | 0.42 | 1.35 | 0.45 |
| 8 | 0.26 | 0.42 | 1.45 | 0.47 |
| 9 | 0.16 | 0.58 | 1.4 | 0.62 |
| 10 | 0.16 | 0.58 | 1.72 | 0.5 |
| 11 | 0.29 | 0.46 | 1.5 | 0.52 |
| 12 | 0.28 | 0.46 | 1.48 | 0.52 |
| 13 | 0.18 | 0.54 | 1.48 | 0.55 |
| 14 | 0.18 | 0.54 | 1.41 | 0.57 |
| 15 | 0.21 | 0.53 | 1.39 | 0.6 |
| 16 | 0.21 | 0.52 | 1.57 | 0.53 |
| 17 | 0.17 | 0.58 | 1.7 | 0.4 |
| 18 | 0.17 | 0.58 | 1.68 | 0.57 |
| 19 | 0.16 | 0.62 | 1.97 | 0.44 |
| 20 | 0.16 | 0.62 | 1.4 | 0.68 |
| 21 | 0.24 | 0.36 | 1.48 | 0.37 |
| 22 | 0.25 | 0.37 | 1.31 | 0.31 |
| 23 | 0.23 | 0.4 | 1.44 | 0.44 |
| 24 | 0.22 | 0.4 | 1.2 | 0.45 |
| 25 | 0.25 | 0.48 | 1.62 | 0.47 |
| 26 | 0.25 | 0.48 | 1.5 | 0.52 |

As shown the distances between HoC features in true dyadic interactions are significantly lower than those computed for nominal dyadic pairs. This illustrates that participants engaging in a true interaction exhibit specific characteristic patterns of engagement and mirroring behavior that set the interactions apart from artificially paired sets of speakers. This also illustrates that the HoC data structures effectively capture these differences in an effective manner.

Figure 5:
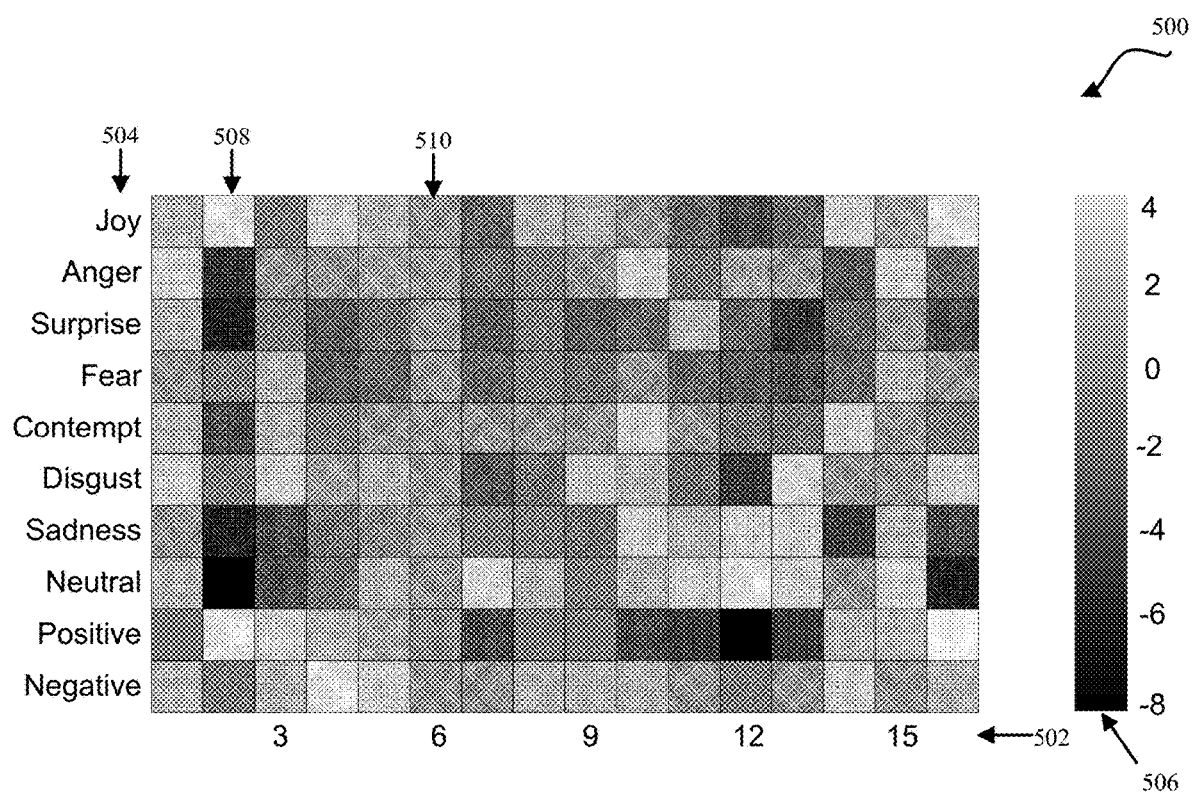
FIG. 5 is a schematic illustration of an emotion feature cluster computer for participates in an interaction.
Figure 6A:
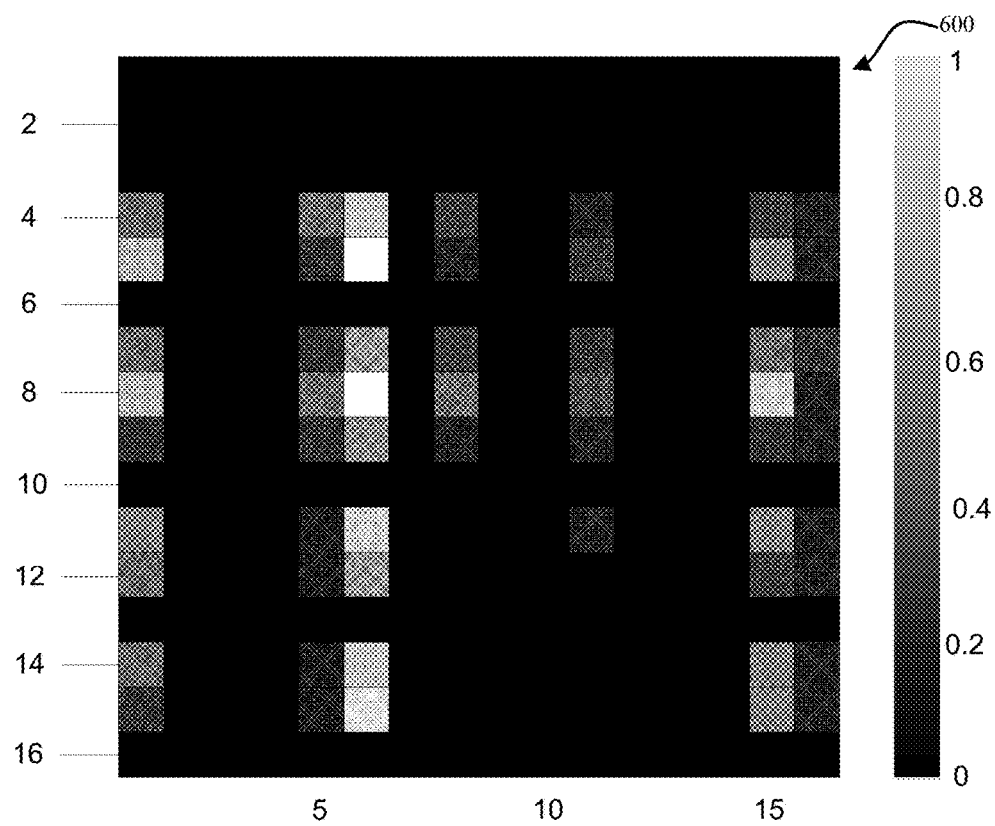
FIG. 6a is an illustration of average histogram of co-occurrence feature distributions for a true dyadic interaction.
Figure 6B:
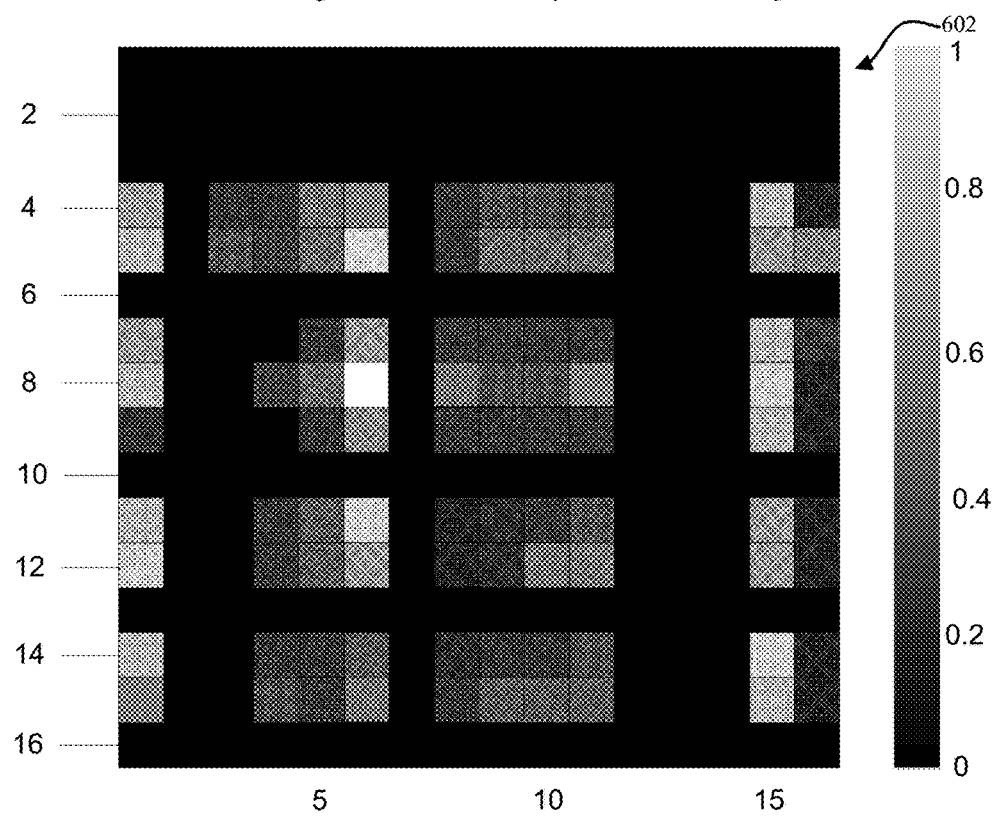
FIG. 6b is an illustration of average histogram of co-occurrence feature distributions for a nominal dyadic interaction.

FIGS. 5, 6a and 6b offer further insight into these HoC features. FIG. 5 depicts a chart 500 illustrating 16 cluster centroids computed on (and therefore common to) all participants. Each column 502 represents one of 16 emotion feature clusters extracted from the temporal behavior records of each participant. Each column represents an emotional cluster centroid, which is a particular distribution of emotional state activations. There are 10 dimensions 504 that describe an emotional state, represented by different rows. The colors represent the odds, in logarithmic (base 10) scale 506, of a target expression being present. For example the second column 508 represents an emotional state with a higher activation of joy and positive emotion and the sixth cluster 510 for example represents a more neutral state, comprising an approximately neutral state. FIG. 6a shows a chart 600 illustrating feature distributions of HoC features computed on one particular participant paired with their true dyadic interaction pair, while FIG. 6b shows a chart 602 that illustrates those computed for the same speaker coupled with an artificially-paired participant (e.g. a nominal dyad). It is observable that the feature distributions of the former have sharper peaks, with certain clusters of emotions co-occurring more than others. In the case of the latter pairing, the distribution is more flat, and more uniformly distributed. While the charts in FIGS. 6a and 6b are particular to one participant, it is observed that these trends are common in general for each participant.

Figure 7:
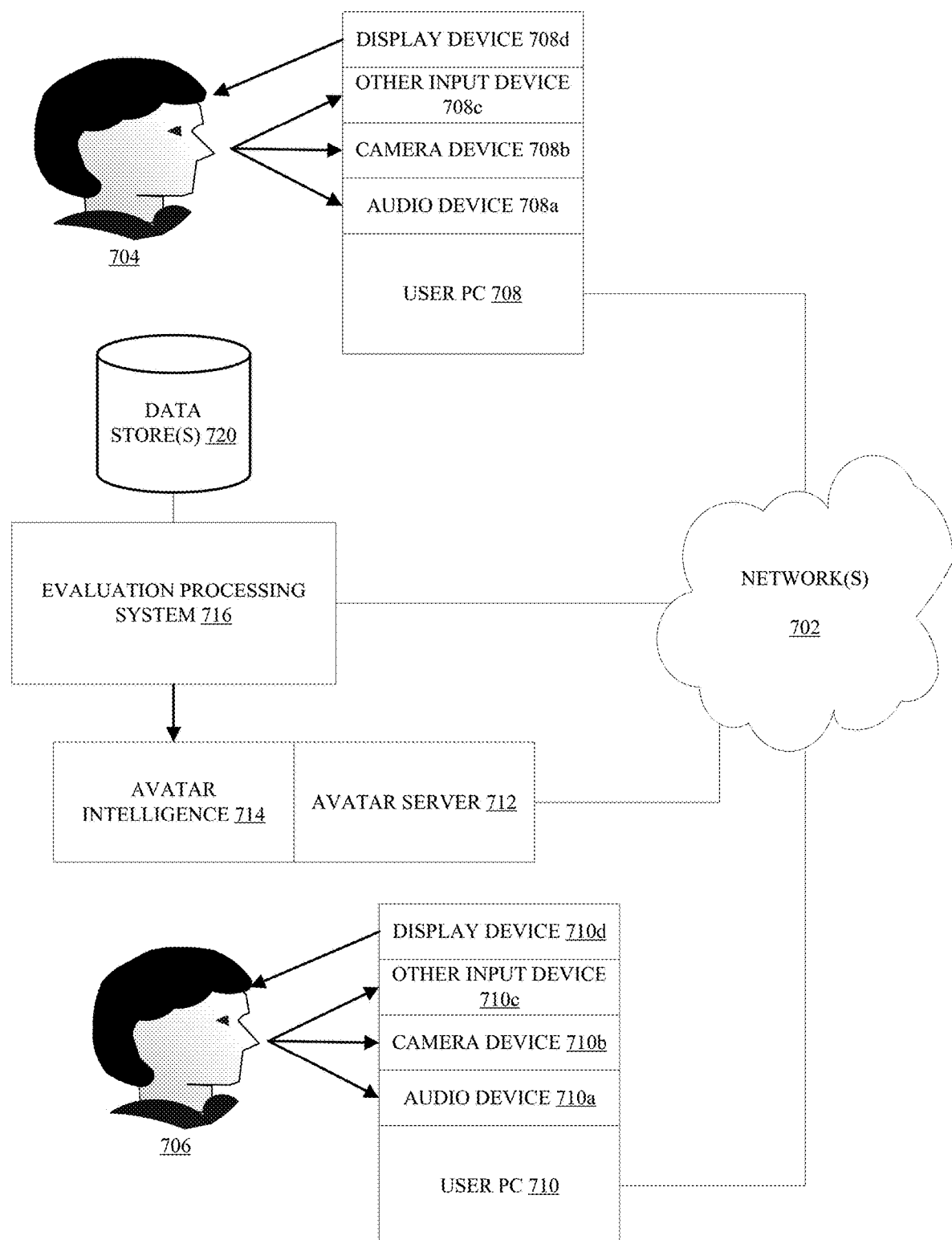
FIG. 7 is a block diagram depicting a system for evaluating an interaction between multiple entities.

FIG. 7 illustrates an exemplary system for evaluating an interaction between three entities, two human participants 704 and 706 and an avatar 712. The avatar 712 is generated, and its behavior controlled by the avatar intelligence 714, which may operate on one or more processing devices. The three participants 704, 706 and 714 interact remotely via network(s) 802. Each human user interacts via a user PC 708 and 710, where each respective PC includes an audio device 708a, 710a, a camera device 708b, 710b, other input devices 708c, 710c (e.g. a mouse or stylus etc.) and a display device 708d, 710d. Each human entity views the other entities vial display devices 708d, 710d, while the avatar receives data associated with each behavior capture device 708a, 710a, 708b, 710b, 708c, 710c, 708d, 710d. The avatar intelligence generates information indicative of the avatars behavior and transmits it to be displayed by the relevant PCs 708, 710 for interaction with the human users 704, 706.

Information relating to the interaction is captured by processes running on each PC 708, 710 and on the avatar server 712, and forwarded to the evaluation processing system 716. Evaluation processing system 716 may include a co-occurrence evaluation engine, e.g. 108b, and an interaction evaluation engine, e.g. 108a, and may interact with data (e.g. analysis weights, scoring model data, prior interaction records, participant specific data and records, etc.) stored in a data store 720. Based on the interactions, behavioral temporal records may be generated and co-occurrences of behavior features may be identified, and a score or feedback report may be generated. This score or feedback report may be used to provide feedback to the human users 704, 706 based on their input to the collaborative interaction, or it may be used to further train the avatar intelligence, for example on how to improves its interpersonal skills when interacting with humans in a collaborative interaction.

FIG. 8 depicts a flowchart of operations in an example computer-implemented method of evaluating an interaction. At 802, a temporal record of first behavior features exhibited by a first entity during interaction with a second entity is generated. And a temporal record of second behavior features exhibited by a second entity during interaction between the second entity and a first entity is generated at 804. A determination is made, at 806, that a first feature occurs in the first temporal record that is associated with a second feature occurring in a second temporal record. An evaluation of the amount of time that occurs between a first feature and a second feature is made at 808. At 810 it is determined that the amount of time satisfies a temporal condition, and responsive to the determination, at 812 a co-occurrence record is generated associated with a first feature and a second feature. The co-occurrence record is then included, at 814, in a co-occurrence record data structure.

Figure 9:
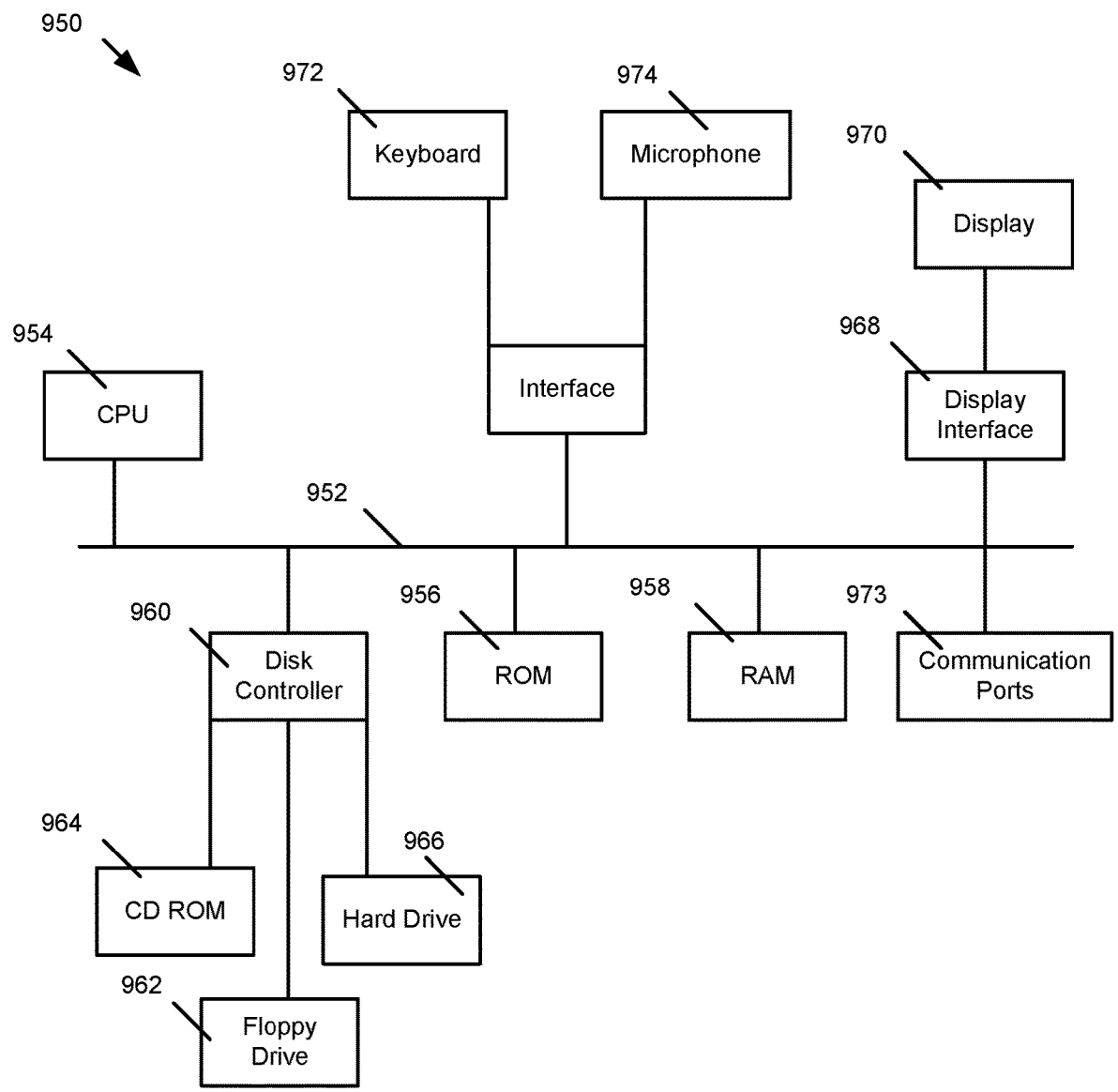
FIG. 9 depicts an exemplary system for use in implementing a presentation evaluation engine.

Examples have been used to describe the invention herein, and the scope of the invention may include other examples. FIG. 9 depicts an example system for use in implementing a presentation evaluation engine. For example, FIG. 9 depicts an exemplary hardware for a standalone computer architecture 950 that may be used to contain and/or implement the program instructions of system embodiments of the present invention. A bus 952 may serve as the information highway interconnecting the other illustrated components of the hardware. A processing system 954 labeled CPU (central processing unit) (e.g., one or more computer processors at a given computer or at multiple computers), may perform calculations and logic operations required to execute a program. A non-transitory processor-readable storage medium, such as read only memory (ROM) 956 and random access memory (RAM) 958, may be in communication with the processing system 954 and may contain one or more programming instructions for performing the method of implementing a presentation evaluation engine. Optionally, program instructions may be stored on a non-transitory computer readable storage medium such as a magnetic disk, optical disk, recordable memory device, flash memory, or other physical storage medium.

A disk controller 960 interfaces one or more optional disk drives to the system bus 952. These disk drives may be external or internal floppy disk drives such as 962, external or internal CD-ROM, CD-R, CD-RW or DVD drives such as 964, or external or internal hard drives 966. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 960, the ROM 956 and/or the RAM 958. Preferably, the processor 954 may access each component as required.

A display interface 968 may permit information from the bus 952 to be displayed on a display 970 in audio, graphic, or alphanumeric format. Communication with external devices may optionally occur using various communication ports 973.

In addition to the standard computer-type components, the hardware may also include data input devices, such as a keyboard 972, or other input device 974, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer implemented method of evaluating an interaction, the method comprising:
   generating a first temporal record of first behavior features exhibited by a first entity during an interaction between the first entity and a second entity;
   generating a second temporal record of second behavior features exhibited by the second entity during the interaction;
   identifying, by a processor, a first feature in the first temporal record;
   identifying, by the processor, a second feature in the second temporal record;
   determining, by the processor, that a length of time between the first feature and the second feature satisfies a temporal condition indicating a co-occurrence between the first feature in the first temporal record and the second feature in the second temporal record;
   generating, by the processor, responsive to the determination, a co-occurrence record associated with the first feature exhibited by the first entity and the second feature exhibited by the second entity;
   generating, by the processor, another co-occurrence record associated with the first feature exhibited by the second entity and the second feature exhibited by the first entity;
   including the two co-occurrence records in a co-occurrence record data-structure; wherein the co-occurrence record data-structure includes a co-occurrence matrix having a plurality of rows and a plurality of columns, and wherein each row of the co-occurrence matrix represents co-occurrence of a different set of behavior features of the first and second entities; and each column of the co-occurrence matrix represents a different time during the interaction between the first and second entities;
   generating, by the processor, a computer scoring model using the co-occurrence record;
   storing the computer scoring model in a non-transitory computer-readable storage medium for use by a computer to automatically score a level of synchronization in verbal and non-verbal aspects of behavior of collaborators in the interaction; and
   generating a score for the interaction based at least on the co-occurrence record using the computer scoring model comprising weighted variables determined by training the computer scoring model relative to a plurality of training data, the training data including a plurality of previously captured interactions.

2. The computer implemented method of claim 1, wherein the temporal condition is a predetermined length of time or wherein the temporal condition is selected based upon the first feature or the second feature.

3. The computer implemented method of claim 1, wherein the interaction includes a collaborative problem solving task, or a negotiation, or a discussion.

4. The computer implemented method of claim 1, wherein the first feature or the second feature comprise a plurality of sub-features that occur during a period of time, the sub-features comprising verbal cues or non-verbal cues.

5. The computer implemented method of claim 1, wherein either the first entity or the second entity is a computer implemented avatar.

6. The computer implemented method of claim 1, wherein behavior features include verbal and non-verbal behavior.

7. The computer implemented method of claim 1, wherein behavior features comprise prototypical behavior states identified based on one or more verbal or non-verbal cues.

8. The computer implemented method of claim 1 further comprising:
   analyzing the behavior of the first entity and the second entity during or after the interaction to identify the first behavior features and the second behavior features.

9. The computer implemented method of claim 8, wherein analyzing the behavior of the first entity or the second entity includes:
   capturing verbal behavior;
   extracting verbal cues from the recorded verbal behavior;
   processing the verbal cues to identify a prototypical behavior state to serve as the first feature or the second feature; and
   associating the prototypical behavior state with a time in the temporal record.

10. The computer implemented method of claim 9, wherein the verbal cues include phonemic qualities of speech, phonetic qualities of speech, prosodic qualities of speech, vocabulary usage, syntactic complexity of speech, response time, verbal non-speech sounds, verbal non-speech qualities, and variations in the rate of speech.

11. The computer implemented method of claim 8, wherein analyzing the behavior of the first entity or the second entity includes:
   capturing non-verbal behavior;
   extracting non-verbal cues from the recorded non-verbal behavior;
   processing the non-verbal cues to identify a prototypical behavior state to serve as either a first behavior feature or a second behavior feature; and
   associating the prototypical behavior state with a time in the temporal record.

12. The computer implemented method of claim 11, wherein the non-verbal cues include text based cues, speed of text generation, response time, text based vocabulary usage, spelling, artifacts, and keystroke intensity.

13. The computer implemented method of claim 11, wherein the non-verbal cues include gestures, posture, environmental interactions, facial expression, response time, direction of gaze, eye focus, and pauses.

14. The computer implemented method of claim 1, wherein either the first feature or the second feature includes a predetermined combination of verbal and non-verbal cues.

15. The computer implemented method of claim 1, wherein the first entity and the second entity comprise a nominal dyad.

16. The computer implemented method of claim 1, wherein the score is used to further train a computer implemented intelligence associated with either the first entity or the second entity.

17. The computer implemented method of claim 1, wherein the interaction occurs via a remote network connection and relies on computer displayed video and computer transmitted audio, and further wherein the first temporal record and the second temporal record are captured by either: one or more processing systems co-located with the first entity and the second entity or by a separate one or more processing system remotely located from either the first entity or the second entity.

18. The computer implemented method of claim 1, wherein entries in the co-occurrence matrix are representative of instances of a co-occurrence of behavior features of the first and second entities.

19. The computer implemented method of claim 18, wherein a histogram of co-occurrence is generated by summing each row of the co-occurrence matrix.

20. The computer implemented method of claim 19, wherein the histogram of co-occurrence is used to identify patterns of behavior co-occurrence.

21. A non-transitory computer-readable storage medium for evaluating an interaction, the computer-readable storage medium comprising computer executable instructions which, when executed, cause a processing system to execute steps including:
generating a first temporal record of first behavior features exhibited by a first entity during an interaction between the first entity and a second entity;
generating a second temporal record of second behavior features exhibited by the second entity during the interaction;
identifying a first feature in the first temporal record;
identifying a second feature in the second temporal record;
determining that a length of time between the first feature and the second feature satisfies a temporal condition indicating a co-occurrence between the first feature in the first temporal record and the second feature in the second temporal record;
generating, responsive to the determination, a co-occurrence record associated with the first feature exhibited by the first entity and the second feature exhibited by the second entity;
generating another co-occurrence record associated with the first feature exhibited by the second entity and the second feature exhibited by the first entity;
including the two co-occurrence records in a co-occurrence record data-structure; wherein the co-occurrence record data-structure includes a co-occurrence matrix having a plurality of rows and a plurality of columns, and wherein each row of the co-occurrence matrix represents co-occurrence of a different set of behavior features of the first and second entities; and each column of the co-occurrence matrix represents a different time during the interaction between the first and second entities;
generating a computer scoring model using the co-occurrence record;
storing the computer scoring model in a non-transitory computer-readable storage medium for use by a computer to automatically score a level of synchronization in verbal and non-verbal aspects of behavior of collaborators in the interaction; and
generating a score for the interaction based at least on the co-occurrence record using the computer scoring model comprising weighted variables determined by training the computer scoring model relative to a plurality of training data, the training data including a plurality of previously captured interactions.

22. A computer-implemented system for evaluating an interaction, the system comprising: a processing system configured for:
generating a first temporal record of first behavior features exhibited by a first entity during an interaction between the first entity and a second entity;
generating a second temporal record of second behavior features exhibited by the second entity during the interaction;
determining that a length of time between a first feature and a second feature satisfies a temporal condition indicating a co-occurrence between the first feature in the first temporal record and the second feature in the second temporal record;
generating, responsive to the determination, a co-occurrence record associated with the first feature exhibited by the first entity and the second feature exhibited by the second entity;
generating another co-occurrence record associated with the first feature exhibited by the second entity and the second feature exhibited by the first entity;
including the two co-occurrence records in a co-occurrence record data-structure; wherein the co-occurrence record data-structure includes a co-occurrence matrix having a plurality of rows and a plurality of columns, and wherein each row of the co-occurrence matrix represents co-occurrence of a different set of behavior features of the first and second entities; and each column of the co-occurrence matrix represents a different time during the interaction between the first and second entities;
generating a computer scoring model using the co-occurrence record;
storing the computer scoring model in a non-transitory computer-readable storage medium for use by a computer to automatically score a level of synchronization in verbal and non-verbal aspects of behavior of collaborators in the interaction; and
generating a score for the interaction based at least on the co-occurrence record using the computer scoring model comprising weighted variables determined by training the computer scoring model relative to a plurality of training data, the training data including a plurality of previously captured interactions.

* * * * *